United States Patent
Kim et al.

(10) Patent No.: US 10,299,107 B2
(45) Date of Patent: May 21, 2019

(54) METHOD FOR TRANSMITTING AND RECEIVING NBIFOM CAPABILITY IN WIRELESS COMMUNICATION SYSTEM, AND DEVICE THEREFOR

(71) Applicant: LG ELECTRONICS INC., Seoul (KR)

(72) Inventors: Taehun Kim, Seoul (KR); Myungjune Youn, Seoul (KR); Hyunsook Kim, Seoul (KR); Jaehyun Kim, Seoul (KR); Jinsook Ryu, Seoul (KR); Laeyoung Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/539,387

(22) PCT Filed: Dec. 11, 2015

(86) PCT No.: PCT/KR2015/013565
§ 371 (c)(1),
(2) Date: Jun. 23, 2017

(87) PCT Pub. No.: WO2016/105004
PCT Pub. Date: Jun. 30, 2016

(65) Prior Publication Data
US 2017/0366960 A1 Dec. 21, 2017

Related U.S. Application Data

(60) Provisional application No. 62/096,902, filed on Dec. 26, 2014, provisional application No. 62/100,487, (Continued)

(51) Int. Cl.
*H04W 4/00* (2018.01)
*H04W 8/08* (2009.01)
(Continued)

(52) U.S. Cl.
CPC .......... *H04W 8/08* (2013.01); *H04W 76/10* (2018.02); *H04W 8/06* (2013.01); *H04W 8/12* (2013.01);
(Continued)

(58) Field of Classification Search
CPC .................................................. H04W 28/0215
See application file for complete search history.

(56) References Cited

U.S. PATENT DOCUMENTS

| | | | |
|---|---|---|---|
| 2011/0116449 A1* | 5/2011 | Hu | H04W 28/06 370/328 |
| 2012/0040687 A1* | 2/2012 | Siomina | G01S 5/0205 455/456.1 |

(Continued)

FOREIGN PATENT DOCUMENTS

| KR | 10-2014-0022400 A | 2/2014 |
|---|---|---|
| KR | 10-2014-0106620 A | 9/2014 |

OTHER PUBLICATIONS

Interdigital Communications, "Assumptions & Scenarios for conflicts between UE-initiated and NW-initiated NBIFOM," SA WG2 Meeting #106, S2-144128, SA WG2 Temporary Document, San Francisco, USA, Nov. 17-21, 2014, pp. 1-3.

(Continued)

*Primary Examiner* — Farah Faroul
(74) *Attorney, Agent, or Firm* — Birch, Stewart, Kolasch & Birch, LLP

(57) ABSTRACT

Disclosed is a method for transmitting and receiving network-based internet protocol flow mobility (NBIFOM) capability, which receives, from a terminal, a first message including NBIFOM capability information of the terminal, checks whether a network entity supports NBIFOM, and receives a second message including NBIFOM capability information of the network entity from another network entity.

10 Claims, 16 Drawing Sheets

Related U.S. Application Data filed on Jan. 7, 2015, provisional application No. 62/154,069, filed on Apr. 28, 2015.

(51) Int. Cl.

| | |
|---|---|
| *H04W 76/10* | (2018.01) |
| *H04W 88/06* | (2009.01) |
| *H04W 28/02* | (2009.01) |
| *H04W 88/16* | (2009.01) |
| *H04W 8/06* | (2009.01) |
| *H04W 8/12* | (2009.01) |
| *H04W 8/24* | (2009.01) |
| *H04W 60/04* | (2009.01) |

(52) U.S. Cl.
CPC .......... *H04W 8/24* (2013.01); *H04W 28/0215* (2013.01); *H04W 60/04* (2013.01); *H04W 88/06* (2013.01); *H04W 88/16* (2013.01)

(56) References Cited

U.S. PATENT DOCUMENTS

| | | | | |
|---|---|---|---|---|
| 2013/0088966 | A1* | 4/2013 | Mahkonen | H04L 63/12 370/235 |
| 2013/0344890 | A1* | 12/2013 | Hahn | H04W 60/00 455/456.1 |
| 2014/0161026 | A1* | 6/2014 | Stojanovski | H04L 45/22 370/328 |
| 2014/0321328 | A1* | 10/2014 | Zuniga | H04W 8/06 370/254 |
| 2015/0230079 | A1* | 8/2015 | Ai | H04W 4/12 370/328 |
| 2015/0327114 | A1* | 11/2015 | Gupta | H04W 40/248 370/235 |
| 2016/0029423 | A1* | 1/2016 | Ke | H04W 76/023 370/329 |
| 2016/0157164 | A1* | 6/2016 | Lee | H04W 76/27 370/329 |
| 2016/0198398 | A1* | 7/2016 | Chen | H04W 48/18 370/329 |
| 2016/0277984 | A1* | 9/2016 | Roeland | H04W 28/08 |
| 2016/0337950 | A1* | 11/2016 | Navas Cornejo | H04W 48/14 |

OTHER PUBLICATIONS

LG Electronics, "Consideration on NBIFOM capability discovery," SA WG2 Meeting #104, S2-142583, SA WG2 Temporary Document, Dublin, Ireland, Jul. 7-11, 2014, pp. 1-3.

SA WG2, "TR 23.861: Network based IP flow mobility (NBIFOM)," 3GPP TSG SA Meeting #66, TD SP-140699, Maui, Hawaii, U.S.A., Dec. 10-12, 2014, 2 pages.

* cited by examiner

FIG. 10
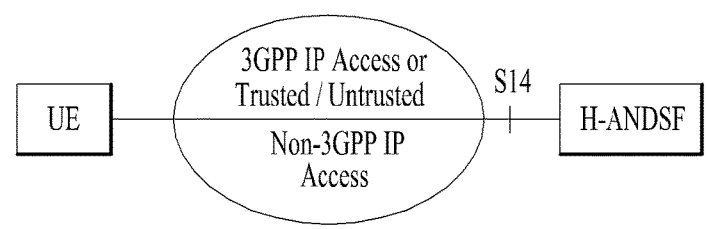
(a)
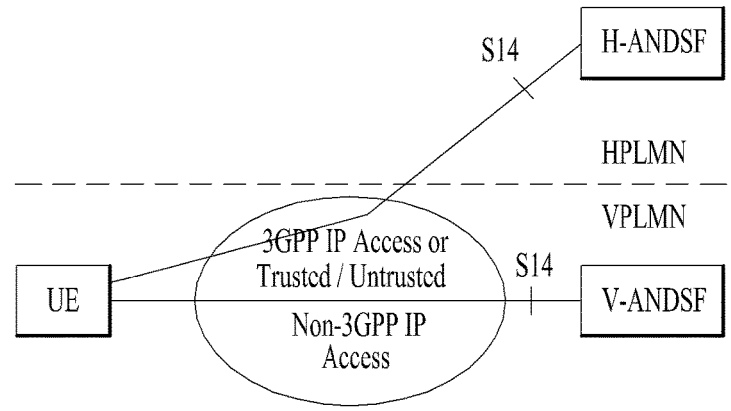
(b)

METHOD FOR TRANSMITTING AND RECEIVING NBIFOM CAPABILITY IN WIRELESS COMMUNICATION SYSTEM, AND DEVICE THEREFOR

CROSS REFERENCE TO RELATED APPLICATIONS

This application is the National Phase of PCT International Application No. PCT/KR2015/013565, filed on Dec. 11, 2015, which claims priority under 35 U.S.C. 119(e) to U.S. Provisional Application No. 62/096,902, filed on Dec. 26, 2014, 62/100,487, filed on Jan. 7, 2015, and 62/154,069 filed on Apr. 28, 2015, all of which are hereby expressly incorporated by reference into the present application.

TECHNICAL FIELD

The present invention relates to a wireless communication system, and more particularly, to a method for transmitting and receiving information on a network based IP flow mobility (NBIFOM) capability and device therefor.

BACKGROUND ART

Wireless access systems have been widely deployed to provide various types of communication services such as voice or data. In general, a wireless access system is a multiple access system that may support communication of multiple users by sharing available system resources (e.g., a bandwidth, transmission power, etc.). For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, and a multi carrier frequency division multiple access (MC-FDMA) system.

DISCLOSURE OF THE INVENTION

Technical Task

An object of the present invention is to propose a mechanism for providing NBIFOM for a mobile communication system such as a 3GPP evolved packet system (EPS).

Another object of the present invention is to improve an NBIFOM support procedure in a heterogeneous network environment.

A further object of the present invention is to support the NBIFOM while minimizing the impact on the conventional communication system.

The technical problems solved by the present invention are not limited to the above technical problems and other technical problems which are not described herein will become apparent to those skilled in the art from the following description.

Technical Solutions

In a first aspect of the present invention, provided herein is an NBIFOM capability transmission and reception method, including: receiving, from a user equipment (UE), a first message including NBIFOM capability information of the UE; checking whether a network entity supports the NBIFOM; and transmitting, to a different network entity, a second message including NBIFOM capability information of the network entity.

When the network entity supports the NBIFOM, the NBIFOM capability information of the network entity may explicitly indicate that the network entity support the NBIFOM or that an entire packet data network (PDN) connection to which the network entity belongs supports the NBIFOM.

When the network entity does not support the NBIFOM, the NBIFOM capability information of the network entity may explicitly indicate that the network entity does not support the NBIFOM or that one or more entities in a packet data network (PDN) connection to which the network entity belongs do not support the NBIFOM, or the NBIFOM capability information of the network entity may be expressed by making an information element (IE) or a field, which is related to the NBIFOM, empty.

When the network entity has NBIFOM-related information as context information, transmitting the second message may be performed without receiving the first message.

The NBIFOM-related information may include information indicating whether the NBIFOM is applied to a packet data network (PDN) including the network entity and the NBIFOM capability information of the UE.

When the network entity determines that a serving gate way (SGW) needs to be changed, transmitting the second message may be performed without receiving the first message.

When the network entity determines that the UE leaves or enters a predetermined area, transmitting the second message may be performed without receiving the first message.

The first message may include an attach procedure message, a tracking area update (TAU) procedure message, or a routing area update (RAU) message.

The second message may include a Create Session Request message, a Modify Bearer Request message or other general packet radio service tunneling protocol-control (GTP-C) messages.

The network entity may be a mobility management entity (MME) or a serving GPRS support node (SGSN) and the different network entity may be a serving gateway (SGW).

In a second aspect of the present invention, provided herein is a network entity, including: a transmitter; a receiver; and a processor connected to the transmitter and the receiver. In this case, the processor may be configured to control the receiver to receive, from a user equipment (UE), a first message including NBIFOM capability information of the UE, check whether the network entity supports the NBIFOM, and control the transmitter to transmit, to a different network entity, a second message including NBIFOM capability information of the network entity.

In a third aspect of the present invention, provided herein is another NBIFOM capability transmission and reception method, including: transmitting a first message including NBIFOM capability information of a user equipment (UE) to a network entity; and receiving, from the network entity, a second message including information indicating whether all network entities included in a packet data network (PDN) connection to which the UE belongs support the NBIFOM.

The information included in the second message may explicitly indicate whether each network entity included in the PDN connection supports the NBIFOM, that all the network entities constituting the PDN connection support the NBIFOM, or that one or more network entities included in the PDN connection do not support the NBIFOM, or the information included in the second message may be expressed by making an information element (IE) or a field, which is related to the NBIFOM, empty.

The NBIFOM capability transmission and reception method may further include transmitting information indicating that among the network entities included in the PDN connection, a mobility management entity (MME) or a serving GPRS support node (SGSN) has been changed, to a packet data network gateway (PGW) through a protocol configuration option (PCO).

When the UE is in an evolved packet system mobility management (EMM) idle state, the UE performs transmitting the information indicating that the MME or the SGSN has been changed after transitioning to an EMM-connected state.

In a fourth aspect of the present invention, provided herein is a user equipment (UE), including: a transmitter; a receiver; and a processor connected to the transmitter and the receiver. In this case, the processor may be configured to control the transmitter to transmit a first message including NBIFOM capability information of the UE to a network entity and control the receiver to receive, from the network entity, a second message including information indicating whether all network entities included in a packet data network (PDN) connection to which the UE belongs support the NBIFOM.

Advantageous Effects

As is apparent from the above description, the embodiments of the present invention have the following effects.

First, it is possible to improve communication efficiency in a mobile communication system to which the NBIFOM is applied.

Second, the NBIFOM can be applied in an improved manner to a heterogeneous network where a network entity supporting the NBIFOM and a network entity not supporting the NBIFOM coexist.

Third, it is possible to transmit and receive NBIFOM information while minimizing the impact on the network entity not supporting the NBIFOM.

The effects of the present invention are not limited to the above-described effects and other effects which are not described herein may be derived by those skilled in the art from the following description of the embodiments of the present invention. That is, effects which are not intended by the present invention may be derived by those skilled in the art from the embodiments of the present invention.

DESCRIPTION OF DRAWINGS

The accompanying drawings, which are included to provide a further understanding of the invention, illustrate embodiments of the invention and together with the description serve to explain the principle of the invention. The technical features of the present invention are not limited to specific drawings and the features shown in the drawings are combined to construct a new embodiment. Reference numerals of the drawings mean structural elements.

FIGS. 10(a) and 10(b) illustrate a network control entity for access network selection.

BEST MODE FOR INVENTION

Figure 1:
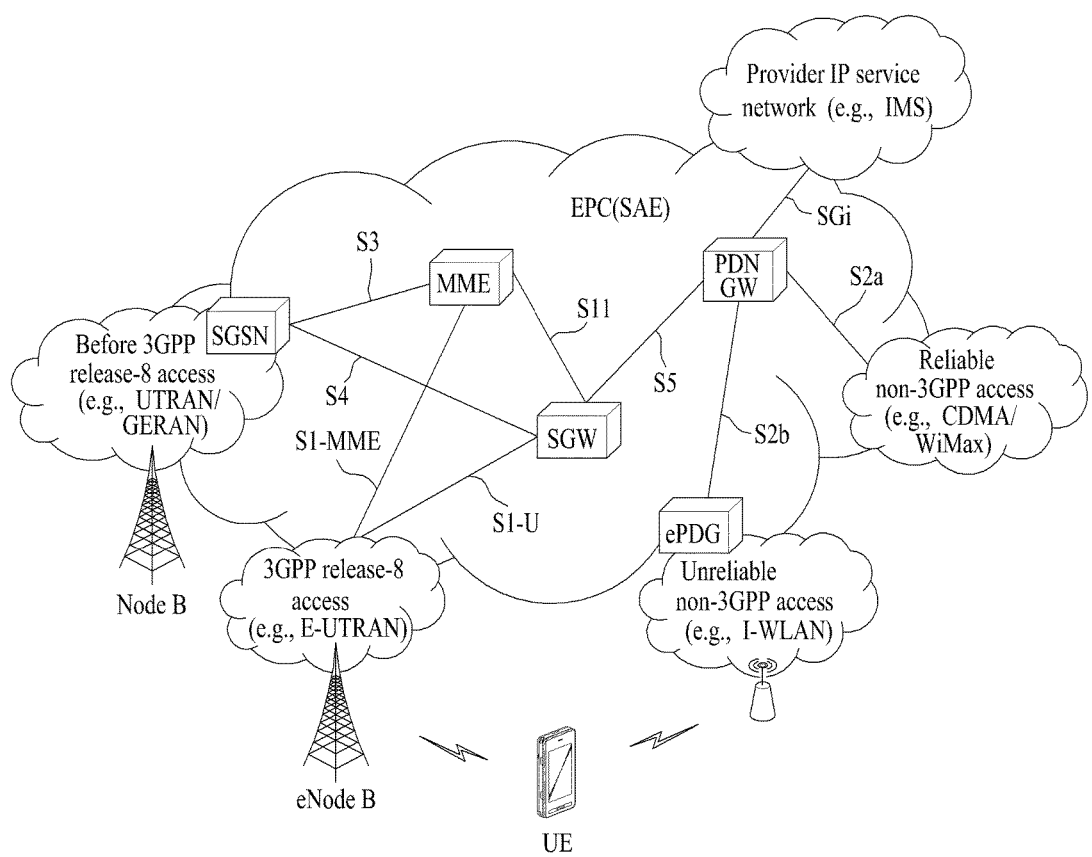
FIG. 1 is a diagram illustrating a brief structure of an evolved packet system (EPS) that includes an evolved packet core (EPC).

Although the terms used in the present invention are selected from generally known and used terms, terms used herein may be varied depending on operator's intention or customs in the art, appearance of new technology, or the like. In addition, some of the terms mentioned in the description of the present invention have been selected by the applicant at his or her discretion, the detailed meanings of which are described in relevant parts of the description herein. Furthermore, it is required that the present invention is understood, not simply by the actual terms used but by the meanings of each term lying within.

The following embodiments are proposed by combining constituent components and characteristics of the present invention according to a predetermined format. The individual constituent components or characteristics should be considered optional factors on the condition that there is no additional remark. If required, the individual constituent components or characteristics may not be combined with other components or characteristics. In addition, some constituent components and/or characteristics may be combined to implement the embodiments of the present invention. The order of operations to be disclosed in the embodiments of the present invention may be changed. Some components or characteristics of any embodiment may also be included in other embodiments, or may be replaced with those of the other embodiments as necessary.

In describing the present invention, if it is determined that the detailed description of a related known function or construction renders the scope of the present invention unnecessarily ambiguous, the detailed description thereof will be omitted.

In the entire specification, when a certain portion "comprises or includes" a certain component, this indicates that the other components are not excluded and may be further included unless specially described otherwise. The terms "unit", "-or/er" and "module" described in the specification indicate a unit for processing at least one function or operation, which may be implemented by hardware, software or a combination thereof. The words "a or an", "one", "the" and words related thereto may be used to include both a singular expression and a plural expression unless the context describing the present invention (particularly, the context of the following claims) clearly indicates otherwise.

The embodiments of the present invention can be supported by the standard documents disclosed in any one of wireless access systems, such as an IEEE 802.xx system, a 3rd Generation Partnership Project (3GPP) system, a 3GPP Long Term Evolution (LTE) system, and a 3GPP2 system. That is, the steps or portions, which are not described in order to make the technical spirit of the present invention clear, may be supported by the above documents.

In addition, all the terms disclosed in the present document may be described by the above standard documents. In particular, the embodiments of the present invention may be supported by at least one of P802.16-2004, P802.16e-2005, P802.16.1, P802.16p and P802.16.1b documents, which are the standard documents of the IEEE 802.16 system.

Hereinafter, the preferred embodiments of the present invention will be described with reference to the accompanying drawings. It is to be understood that the detailed description which will be disclosed along with the accompanying drawings is intended to describe the exemplary embodiments of the present invention, and is not intended to describe a unique embodiment which the present invention can be carried out.

It should be noted that specific terms disclosed in the present invention are proposed for convenience of description and better understanding of the present invention, and the use of these specific terms may be changed to another format within the technical scope or spirit of the present invention.

First of all, the terms used in this specification can be defined as follows.

UMTS (Universal Mobile Telecommunications System): a GSM (Global System for Mobile Communication) based third generation mobile communication technology developed by the 3GPP.

EPS (Evolved Packet System): a network system that includes an EPC (Evolved Packet Core) which is an IP (Internet Protocol) based packet switched core network and an access network such as LTE and UTRAN. This system is the network of an evolved version of the UMTS.

NodeB: a base station of GERAN/UTRAN. This base station is installed outdoor and its coverage has a scale of a macro cell.

eNodeB: a base station of LTE. This base station is installed outdoor and its coverage has a scale of a macro cell.

UE (User Equipment): the UE may be referred to as terminal, ME (Mobile Equipment), MS (Mobile Station), etc. Also, the UE may be a portable device such as a notebook computer, a cellular phone, a PDA (Personal Digital Assistant), a smart phone, and a multimedia device. Alternatively, the UE may be a non-portable device such as a PC (Personal Computer) and a vehicle mounted device. The term "UE", as used in relation to MTC, can refer to an MTC device.

HNB (Home NodeB): a base station of UMTS network. This base station is installed indoor and its coverage has a scale of a micro cell.

HeNB (Home eNodeB): a base station of an EPS network. This base station is installed indoor and its coverage has a scale of a micro cell.

MME (Mobility Management Entity): a network node of an EPS network, which performs mobility management (MM) and session management (SM).

PDN-GW (Packet Data Network-Gateway)/PGW: a network node of an EPS network, which performs UE IP address allocation, packet screening and filtering, charging data collection, etc.

SGW (Serving Gateway): a network node of an EPS network, which performs mobility anchor, packet routing, idle-mode packet buffering, and triggering of an MME's UE paging.

NAS (Non-Access Stratum): an upper stratum of a control plane between a UE and an MME. This is a functional layer for transmitting and receiving a signaling and traffic message between a UE and a core network in an LTE/UMTS protocol stack, and supports mobility of a UE, and supports a session management procedure of establishing and maintaining IP connection between a UE and a PDN GW.

PDN (Packet Data Network): a network in which a server supporting a specific service (e.g., a Multimedia Messaging Service (MMS) server, a Wireless Application Protocol (WAP) server, etc.) is located.

PDN connection: a logical connection between a UE and a PDN, represented as one IP address (one IPv4 address and/or one IPv6 prefix).

RAN (Radio Access Network): a unit including a Node B, an eNode B, and a Radio Network Controller (RNC) for controlling the Node B and the eNode B in a 3GPP network, which is present between UEs and provides a connection to a core network.

HLR (Home Location Register)/HSS (Home Subscriber Server): a database having subscriber information in a 3GPP network. The HSS can perform functions such as configuration storage, identity management, and user state storage.

PLMN (Public Land Mobile Network): a network configured for the purpose of providing mobile communication services to individuals. This network can be configured per operator.

ANDSF (Access Network Discovery and Selection Function): This is one of network entities for providing a policy for discovering and selecting an access that can be used by a UE on an operator basis.

ISRP (Inter-System Routing Policy): This is a protocol defined by the operator to indicate which one will be used by the UE for routing of IP traffic among several radio access interfaces. The ISRP may include three types of protocols as follows, as a policy for defining an access network preferred (i.e., having a high priority) or restricted to route/steer a packet service (or an IP flow or IP traffic or applications). That is, the ISRP may be divided into an IP flow mobility (IFOM) protocol, a multi access PDN connectivity (MAPCON) protocol, and a non-seamless WLAN offload (NSWO) protocol as follows.

IFOM (IP Flow Mobility) protocol: This protocol is in regards to a list in which access technologies/access networks to be used by the UE are arranged according to a priority, when traffic matched to a specific IP traffic filter can be routed on a specific APN or on a random APN. Further, this protocol may designate for which radio access the traffic matched to the specific IP traffic filter is limited on the specific APN or on the random APN.

MAPCON (Multi Access PDN Connectivity) protocol: This protocol is a list in which the access technologies/access networks to be used by the LIE are arranged according to the priority when a PDN connection for the specific APN can be routed. Further, this protocol may designate for which radio access a PDN connection to a specific APN will be limited.

NSWO(Non-seamless WLAN offload) protocol: This protocol designates whether certain traffic will be offloaded or not offloaded non-seamlessly to a WLAN.

ISMP (Inter-System Mobility Policy): This is a set of protocols defined by an operator to have an impact on an inter-system mobility decision made by the UE. When the UE can route IP traffic on a single radio access interface, the UE may use ISMP to select the most appropriate access technology type or access network in a given time.

RAN rule: This is a rule received from the network and is called RAN support information. The RAN rule is also called WLAN interworking supported by the RAN used without ANDSF ISRP/ISMP. When the RAN rule for moving traffic to the WLAN is satisfied, an access stratum (AS) layer of the UE delivers a move-traffic-to-WLAN indication and a WLAN identifier together to a higher layer of the UE. Alternatively, when the RAN rule for moving the traffic to the 3GPP access is satisfied, the AS layer of the UE delivers a move-traffic-from-WLAN indication to the higher layer of the UE. 3GPP. 3GPP TS 23.401, TS 23.060, TS 23.402, TS 36.300, TS 36.304, TS 36.331, TS 25.304, and TS 25.331 may be incorporated herein for detailed descriptions on the RAN rule.

Local Operating Environment Information: This is a set of implementation specific parameters which describe the local environment in which the UE is operating.

Network-Based IP Flow Mobility (NBIFOM): This is IP flow mobility based on network based mobility protocol (GTP or PMIP).

UE-initiated NBIFOM: This is NBIFOM in which the UE initiates IP flow mobility.

Network-initiated NBIFOM: This is NBIFOM in which the network initiates IP flow mobility.

Multi-access PDN connection: This is a PDN connection in which traffic can be routed through the 3GPP access and/or the WLAN access. Each IP flow is routed only through one access at one instance.

Routing filter: This is a set of IP header parameter values/ranges of a packet flow used to identify IP flow for the purpose of routing.

Routing access type: This is a type of an access for routing a set of IP flows of PDN connection (3GPP access or WLAN access.

Routing Rule (RR): This is a set of information that enables association between the routing filter and the routing access type.

1. Evolved Packet Core (EPC)

FIG. 1 is a schematic diagram showing the structure of an evolved packet system (EPS) including an evolved packet core (EPC).

The EPC is a core element of system architecture evolution (SAE) for improving performance of 3GPP technology. SAE corresponds to a research project for determining a network structure supporting mobility between various types of networks. For example, SAE aims to provide an optimized packet-based system for supporting various radio access technologies and providing an enhanced data transmission capability.

Specifically, the EPC is a core network of an IP mobile communication system for 3GPP LTE and can support real-time and non-real-time packet-based services. In conventional mobile communication systems (i.e. second-generation or third-generation mobile communication systems), functions of a core network are implemented through a circuit-switched (CS) sub-domain for voice and a packet-switched (PS) sub-domain for data. However, in a 3GPP LTE system which is evolved from the third generation communication system, CS and PS sub-domains are unified into one IP domain. That is, in 3GPP LTE, connection of terminals having IP capability can be established through an IP-based business station (e.g., an eNodeB (evolved Node B)), EPC, and an application domain (e.g., IMS). That is, the EPC is an essential structure for end-to-end IP services.

The EPC may include various components. FIG. 1 shows some of the components, namely, a serving gateway (SGW), a packet data network gateway (PDN GW), a mobility management entity (MME), a serving GPRS (general packet radio service) supporting node (SGSN) and an enhanced packet data gateway (ePDG).

The SGW operates as a boundary point between a radio access network (RAN) and a core network and maintains a data path between an eNodeB and the PDN GW. When. When a terminal moves over an area served by an eNodeB, the SGW functions as a local mobility anchor point. That is, packets. That is, packets may be routed through the SGW for mobility in an evolved UMTS terrestrial radio access network (E-UTRAN) defined after 3GPP release-8. In addition, the SGW may serve as an anchor point for mobility of another 3GPP network (a RAN defined before 3GPP release-8, e.g., UTRAN or GERAN (global system for mobile communication (GSM)/enhanced data rates for global evolution (EDGE) radio access network).

The PDN GW corresponds to a termination point of a data interface for a packet data network. The PDN GW may support policy enforcement features, packet filtering and charging support. In addition, the PDN GW may serve as an anchor point for mobility management with a 3GPP network and a non-3GPP network (e.g., an unreliable network such as an interworking wireless local area network (I-WLAN) and a reliable network such as a code division multiple access (CDMA) or WiMax network).

Although the SGW and the PDN GW are configured as separate gateways in the example of the network structure of FIG. 1, the two gateways may be implemented according to a single gateway configuration option.

The MME performs signaling and control functions for supporting access of a UE for network connection, network resource allocation, tracking, paging, roaming and handover. The MME controls control plane functions associated with subscriber and session management. The MME manages numerous eNodeBs and signaling for selection of a conventional gateway for handover to other 2G/3G networks. In addition, the MME performs security procedures, terminal-to-network session handling, idle terminal location management, etc.

The SGSN handles all packet data such as mobility management and authentication of a user for other 3GPP networks (e.g., a GPRS network).

The ePDG serves as a security node for a non-3GPP network (e.g., an I-WLAN, a Wi-Fi hotspot, etc.).

As described above with reference to FIG. 1, a terminal having IP capabilities may access an IP service network (e.g., an IMS) provided by an operator via various elements in the EPC not only based on 3GPP access but also on non-3GPP access.

Additionally, FIG. 1 shows various reference points (e.g. S1-U, S1-MME, etc.). In 3GPP, a conceptual link connecting two functions of different functional entities of an E-UTRAN and an EPC is defined as a reference point. Table 1 is a list of the reference points shown in FIG. 1. Various reference points may be present in addition to the reference points in Table 1 according to network structures.

TABLE 1

| Reference point | Description |
| --- | --- |
| S1-MME | Reference point for the control plane protocol between E-UTRAN and MME |
| S1-U | Reference point between E-UTRAN and Serving GW for the per bearer user plane tunneling and inter eNodeB path switching during handover |
| S3 | It enables user and bearer information exchange for inter 3GPP access network mobility in idle and/or active state. This reference point can be used intra-PLMN or inter-PLMN (e.g. in the case of Inter-PLMN HO). |
| S4 | It provides related control and mobility support between GPRS Core and the 3GPP Anchor function of Serving GW. In addition, if Direct Tunnel is not established, it provides the user plane tunneling. |
| S5 | It provides user plane tunneling and tunnel management between Serving GW and PDN GW. It is used for Serving GW relocation due to UE mobility and if the Serving GW needs to connect to a non-collocated PDN GW for the required PDN connectivity. |
| S11 | Reference point between an MME and an SGW |
| SGi | It is the reference point between the PDN GW and the packet data network. Packet data network may be an operator external public or private packet data network or an intra operator packet data network, e.g. for provision of IMS services. This reference point corresponds to Gi for 3GPP accesses. |

Among the reference points shown in FIG. 1, S2a and S2b correspond to non-3GPP interfaces. S2a is a reference point which provides reliable non-3GPP access and related control and mobility support between PDN GWs to a user plane. S2b is a reference point which provides related control and mobility support between the ePDG and the PDN GW to the user plane.

Figure 2:
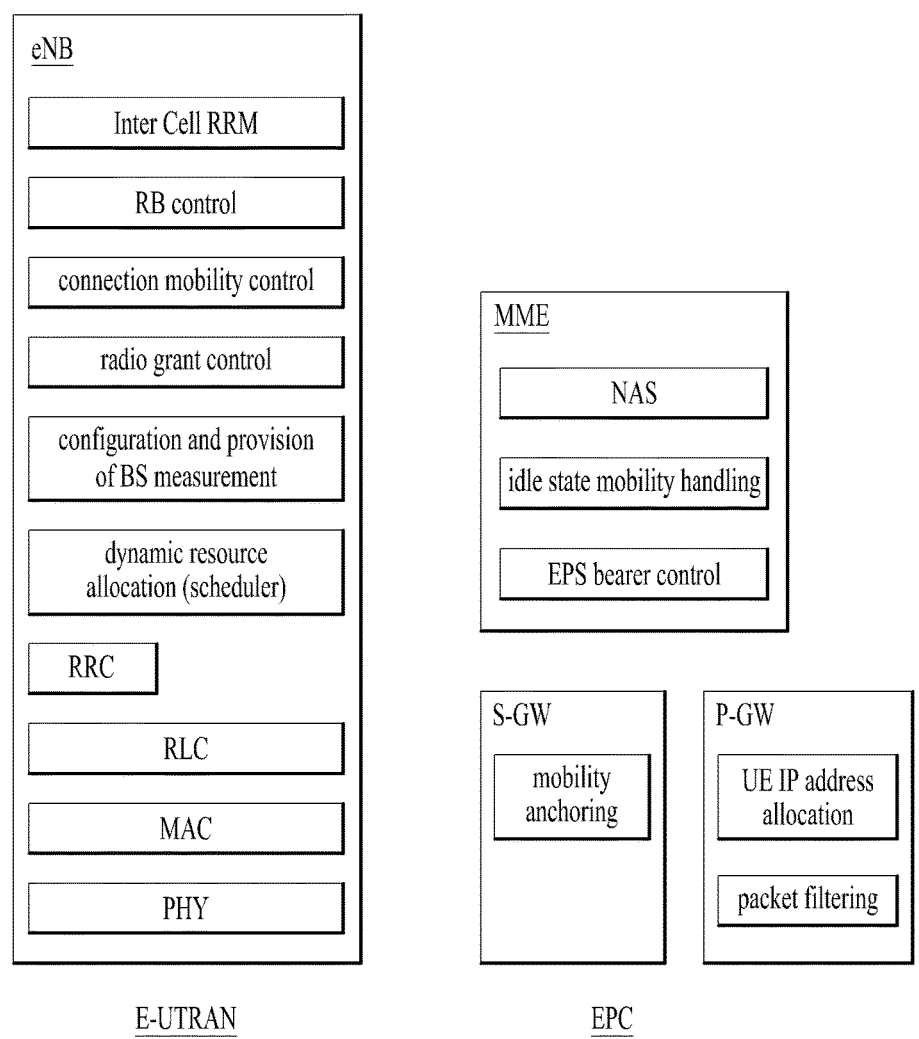
FIG. 2 is an exemplary diagram illustrating an architecture of a general E-UTRAN and a general EPC.

FIG. 2 is a diagram exemplarily illustrating architectures of a typical E-UTRAN and EPC.

As shown in the figure, while radio resource control (RRC) connection is activated, an eNodeB may perform routing to a gateway, scheduling transmission of a paging message, scheduling and transmission of a broadcast channel (BCH), dynamic allocation of resources to a UE on uplink and downlink, configuration and provision of eNodeB measurement, radio bearer control, radio admission control, and connection mobility control. In the EPC, paging generation, LTE_IDLE state management, ciphering of the user plane, SAE bearer control, and ciphering and integrity protection of NAS signaling.

Figure 3:
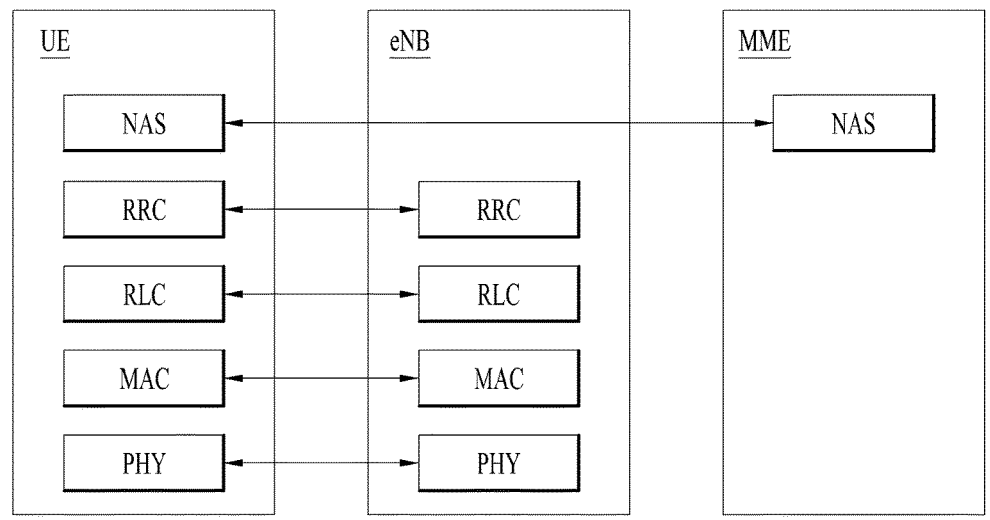
FIG. 3 is an exemplary diagram illustrating a structure of a radio interface protocol on a control plane.
Figure 4:
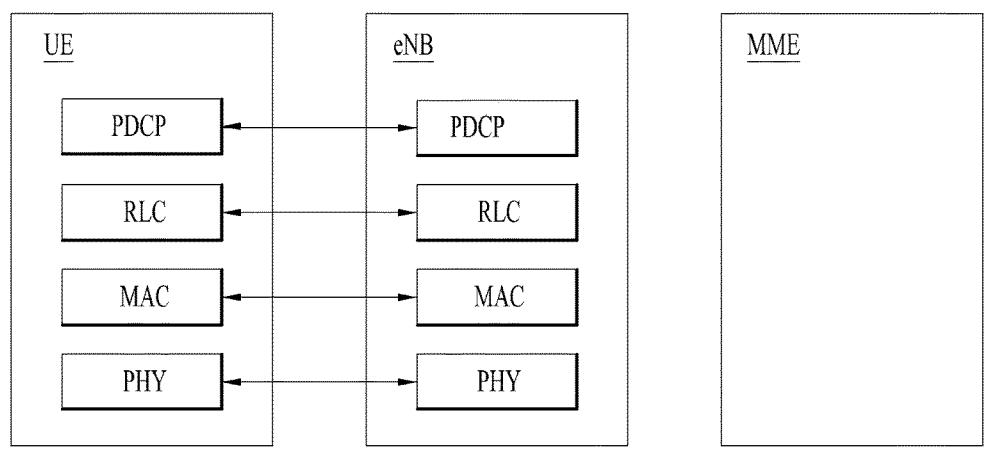
FIG. 4 is an exemplary diagram illustrating a structure of a radio interface protocol on a user plane.

FIG. 3 is a diagram exemplarily illustrating the structure of a radio interface protocol in a control plane between a UE and a base station, and FIG. 4 is a diagram exemplarily illustrating the structure of a radio interface protocol in a user plane between the UE and the base station.

The radio interface protocol is based on the 3GPP wireless access network standard. The radio interface protocol horizontally includes a physical layer, a data link layer, and a networking layer. The radio interface protocol is divided into a user plane for transmission of data information and a control plane for delivering control signaling which are arranged vertically.

The protocol layers may be classified into a first layer (L1), a second layer (L2), and a third layer (L3) based on the three sublayers of the open system interconnection (OSI) model that is well known in the communication system.

Hereinafter, description will be given of a radio protocol in the control plane shown in FIG. 3 and a radio protocol in the user plane shown in FIG. 4.

The physical layer, which is the first layer, provides an information transfer service using a physical channel. The physical channel layer is connected to a medium access control (MAC) layer, which is a higher layer of the physical layer, through a transport channel. Data is transferred between the physical layer and the MAC layer through the transport channel. Transfer of data between different physical layers, i.e., a physical layer of a transmitter and a physical layer of a receiver is performed through the physical channel.

The physical channel consists of a plurality of subframes in the time domain and a plurality of subcarriers in the frequency domain. One subframe consists of a plurality of symbols in the time domain and a plurality of subcarriers. One subframe consists of a plurality of resource blocks. One resource block consists of a plurality of symbols and a plurality of subcarriers. A Transmission Time Interval (TTI), a unit time for data transmission, is 1 ms, which corresponds to one subframe.

According to 3GPP LTE, the physical channels present in the physical layers of the transmitter and the receiver may be divided into data channels corresponding to Physical Downlink Shared Channel (PDSCH) and Physical Uplink Shared Channel (PUSCH) and control channels corresponding to Physical Downlink Control Channel (PDCCH), Physical Control Format Indicator Channel (PCFICH), Physical Hybrid-ARQ Indicator Channel (PHICH) and Physical Uplink Control Channel (PUCCH).

The second layer includes various layers. First, the MAC layer in the second layer serves to map various logical channels to various transport channels and also serves to map various logical channels to one transport channel. The MAC layer is connected with an RLC layer, which is a higher layer, through a logical channel. The logical channel is broadly divided into a control channel for transmission of information of the control plane and a traffic channel for transmission of information of the user plane according to the types of transmitted information.

The radio link control (RLC) layer in the second layer serves to segment and concatenate data received from a higher layer to adjust the size of data such that the size is suitable for a lower layer to transmit the data in a radio interval.

The Packet Data Convergence Protocol (PDCP) layer in the second layer performs a header compression function of reducing the size of an IP packet header which has a relatively large size and contains unnecessary control information, in order to efficiently transmit an IP packet such as an IPv4 or IPv6 packet in a radio interval having a narrow bandwidth. In addition, in LTE, the PDCP layer also performs a security function, which consists of ciphering for preventing a third party from monitoring data and integrity protection for preventing data manipulation by a third party.

The Radio Resource Control (RRC) layer, which is located at the uppermost part of the third layer, is defined only in the control plane, and serves to configure radio bearers (RBs) and control a logical channel, a transport channel, and a physical channel in relation to reconfiguration and release operations. The RB represents a service provided by the second layer to ensure data transfer between a UE and the E-UTRAN.

If an RRC connection is established between the RRC layer of the UE and the RRC layer of a wireless network, the UE is in the RRC Connected mode. Otherwise, the UE is in the RRC Idle mode.

Hereinafter, description will be given of the RRC state of the UE and an RRC connection method. The RRC state refers to a state in which the RRC of the UE is or is not logically connected with the RRC of the E-UTRAN. The RRC state of the UE having logical connection with the RRC of the E-UTRAN is referred to as an RRC_CONNECTED state. The RRC state of the UE which does not have logical connection with the RRC of the E-UTRAN is referred to as an RRC_IDLE state. A UE in the RRC_CONNECTED state has RRC connection, and thus the E-UTRAN may recognize presence of the UE in a cell unit. Accordingly, the UE may be efficiently controlled. On the other hand, the E-UTRAN cannot recognize presence of a UE which is in the RRC_IDLE state. The UE in the RRC_IDLE state is managed by a core network in a tracking area (TA) which is an area unit larger than the cell. That is, for the UE in the RRC_IDLE state, only presence or absence of the UE is recognized in an area unit larger than the cell. In order for the UE in the RRC_IDLE state to be provided with a usual mobile communication service such as a voice service and a data service, the UE should transition to the RRC_CONNECTED state. A TA is distinguished from another TA by a tracking area identity (TAI) thereof. A UE may configure the TAI through a tracking area code (TAC), which is information broadcast from a cell.

When the user initially turns on the UE, the UE searches for a proper cell first. Then, the UE establishes RRC connection in the cell and registers information thereabout in the core network. Thereafter, the UE stays in the RRC_IDLE state. When necessary, the UE staying in the RRC_IDLE state selects a cell (again) and checks system information or paging information. This operation is called camping on a cell. Only when the UE staying in the RRC_IDLE state needs to establish RRC connection, does the UE establish RRC connection with the RRC layer of the E-UTRAN through the RRC connection procedure and transition to the RRC_CONNECTED state. The UE staying in the RRC_IDLE state needs to establish RRC connection in many cases. For example, the cases may include an attempt of a user to make a phone call, an attempt to transmit data, or transmission of a response message after reception of a paging message from the E-UTRAN.

The non-access stratum (NAS) layer positioned over the RRC layer performs functions such as session management and mobility management.

Hereinafter, the NAS layer shown in FIG. 3 will be described in detail.

The eSM (evolved Session Management) belonging to the NAS layer performs functions such as default bearer management and dedicated bearer management to control a UE to use a PS service from a network. The UE is assigned a default bearer resource by a specific packet data network (PDN) when the UE initially accesses the PDN. In this case, the network allocates an available IP to the UE to allow the UE to use a data service. The network also allocates QoS of a default bearer to the UE. LTE supports two kinds of bearers. One bearer is a bearer having characteristics of guaranteed bit rate (GBR) QoS for guaranteeing a specific bandwidth for transmission and reception of data, and the other bearer is a non-GBR bearer which has characteristics of best effort QoS without guaranteeing a bandwidth. The default bearer is assigned to a non-GBR bearer. The dedicated bearer may be assigned a bearer having QoS characteristics of GBR or non-GBR.

A bearer allocated to the UE by the network is referred to as an evolved packet service (EPS) bearer. When the EPS bearer is allocated to the UE, the network assigns one ID. This ID is called an EPS bearer ID. One EPS bearer has QoS characteristics of a maximum bit rate (MBR) and/or a guaranteed bit rate (GBR).

Figure 5:
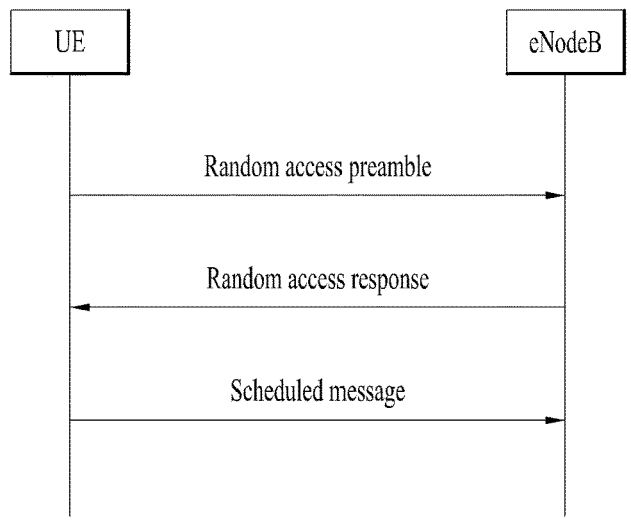
FIG. 5 is a flow chart illustrating a random access procedure.

FIG. 5 is a flowchart illustrating a random access procedure in 3GPP LTE.

The random access procedure is performed for a UE to obtain UL synchronization with an eNB or to be assigned a UL radio resource.

The UE receives a root index and a physical random access channel (PRACH) configuration index from an eNodeB. Each cell has 64 candidate random access preambles defined by a Zadoff-Chu (ZC) sequence. The root index is a logical index used for the UE to generate 64 candidate random access preambles.

Transmission of a random access preamble is limited to a specific time and frequency resources for each cell. The PRACH configuration index indicates a specific subframe and preamble format in which transmission of the random access preamble is possible.

The UE transmits a randomly selected random access preamble to the eNodeB. The UE selects a random access preamble from among 64 candidate random access preambles and the UE selects a subframe corresponding to the PRACH configuration index. The UE transmits the selected random access preamble in the selected subframe.

Upon receiving the random access preamble, the eNodeB sends a random access response (RAR) to the UE. The RAR is detected in two steps. First, the UE detects a PDCCH masked with a random access (RA)-RNTI. The UE receives an RAR in a MAC (medium access control) PDU (protocol data unit) on a PDSCH indicated by the detected PDCCH.

Figure 6:
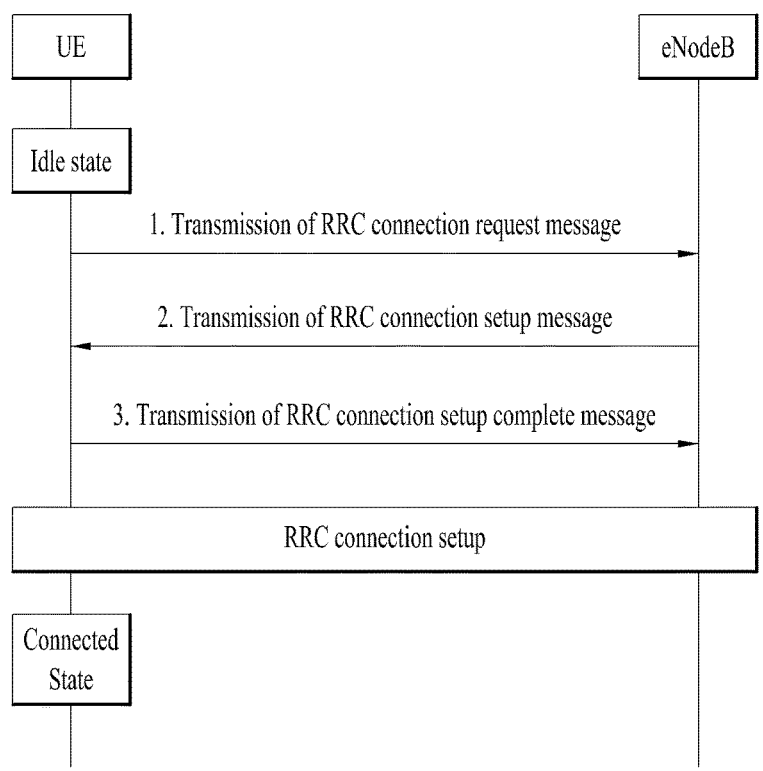
FIG. 6 is a diagram illustrating a connection procedure in a radio resource control (RRC) layer.

FIG. 6 illustrates a connection procedure in a radio resource control (RRC) layer.

As shown in FIG. 6, the RRC state is set according to whether or not RRC connection is established. An RRC state indicates whether or not an entity of the RRC layer of a UE has logical connection with an entity of the RRC layer of an eNodeB. An RRC state in which the entity of the RRC layer of the UE is logically connected with the entity of the RRC layer of the eNodeB is called an RRC connected state. An RRC state in which the entity of the RRC layer of the UE is not logically connected with the entity of the RRC layer of the eNodeB is called an RRC idle state.

A UE in the Connected state has RRC connection, and thus the E-UTRAN may recognize presence of the UE in a cell unit. Accordingly, the UE may be efficiently controlled. On the other hand, the E-UTRAN cannot recognize presence of a UE which is in the idle state. The UE in the idle state is managed by the core network in a tracking area unit which is an area unit larger than the cell. The tracking area is a unit of a set of cells. That is, for the UE which is in the idle state, only presence or absence of the UE is recognized in a larger area unit. In order for the UE in the idle state to be provided with a usual mobile communication service such as a voice service and a data service, the UE should transition to the connected state.

When the user initially turns on the UE, the UE searches for a proper cell first, and then stays in the idle state. Only when the UE staying in the idle state needs to establish RRC connection, the UE establishes RRC connection with the RRC layer of the eNodeB through the RRC connection procedure and then performs transition to the RRC connected state.

The UE staying in the idle state needs to establish RRC connection in many cases. For example, the cases may include an attempt of a user to make a phone call, an attempt to transmit data, or transmission of a response message after reception of a paging message from the E-UTRAN.

In order for the UE in the idle state to establish RRC connection with the eNodeB, the RRC connection procedure needs to be performed as described above. The RRC connection procedure is broadly divided into transmission of an RRC connection request message from the UE to the eNodeB, transmission of an RRC connection setup message from the eNodeB to the UE, and transmission of an RRC connection setup complete message from the UE to eNodeB, which are described in detail below with reference to FIG. 6.

1) When the UE in the idle state desires to establish RRC connection for reasons such as an attempt to make a call, a data transmission attempt, or a response of the eNodeB to paging, the UE transmits an RRC connection request message to the eNodeB first.

2) Upon receiving the RRC connection request message from the UE, the ENB accepts the RRC connection request of the UE when the radio resources are sufficient, and then transmits an RRC connection setup message, which is a response message, to the UE.

3) Upon receiving the RRC connection setup message, the UE transmits an RRC connection setup complete message to the eNodeB. Only when the UE successfully transmits the RRC connection setup message, does the UE establish RRC connection with the eNodeB and transition to the RRC connected mode.

2. Connection of WLAN and EPC

Figure 7:
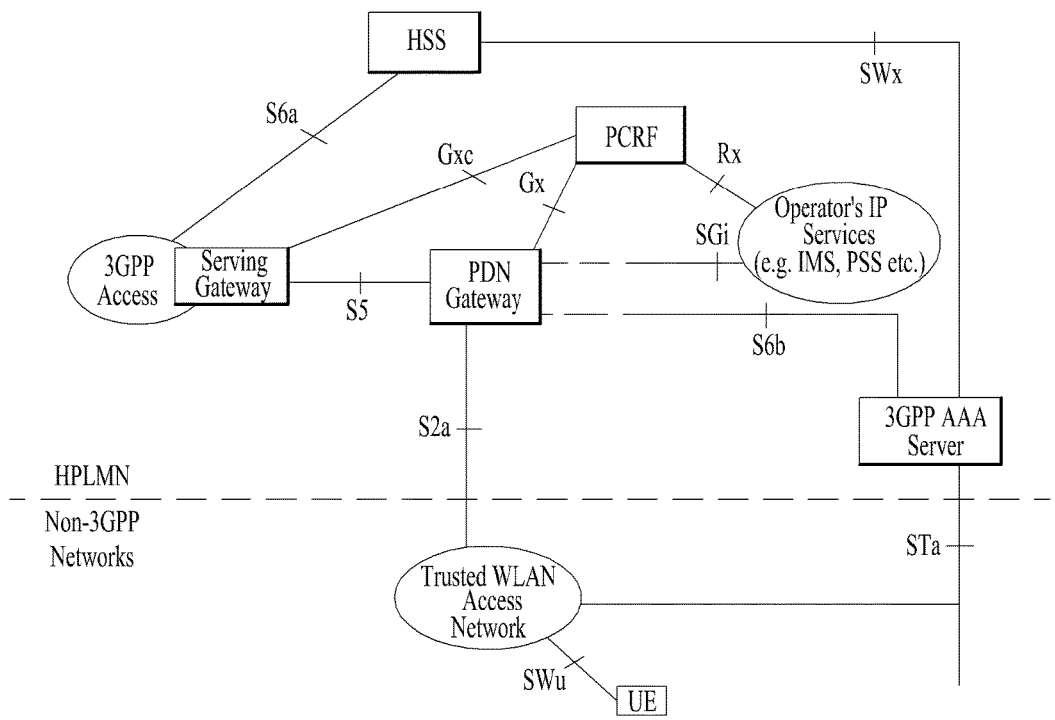
FIGS. 7 and 8 illustrates an example of a structure of a WLAN connected to an EPC.
Figure 8:
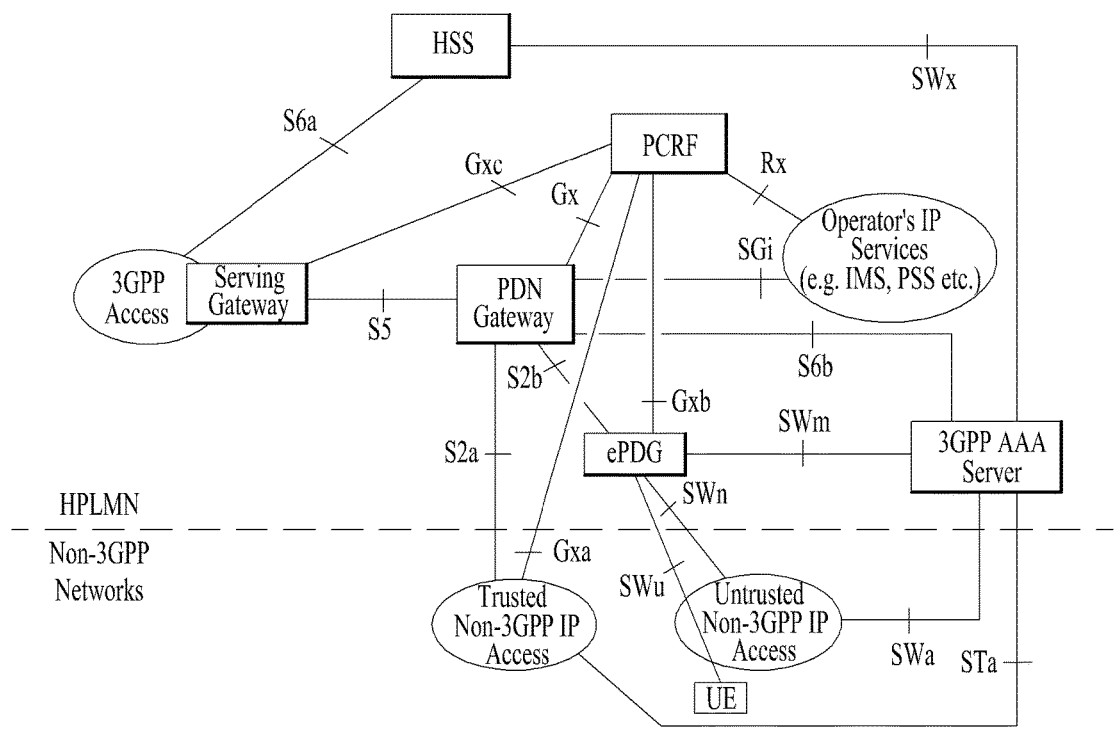

FIGS. 7 and 8 illustrate an architecture for connecting a WLAN to an EPC. Specifically, FIG. 7 illustrates an architecture in which a WLAN is connected to a P-GW through an S2a interface (see 3GPP TS 23.402). As can be seen with reference to FIG. 7, a WLAN access network (in particular, it is a trusted WLAN access network since the S2a interface is an interface for connecting a trusted non-3GPP access to the EPC) is connected to the P-GW through the S2a interface. The content disclosed in TS 23.402 is incorporated herein by reference for an architecture for a trusted WLAN access network (TWAN).

FIG. 8 illustrates an architecture in which a WLAN is connected to a P-GW through an S2b interface. As can be seen with reference to FIG. 8, a WLAN access network (in particular, it is an untrusted WLAN access network since the S2b interface is an interface for connecting an untrusted non-3GPP access to the EPC) is connected to the P-GW through an evolved packet data gateway (ePDG) connected to the P-GW through the S2b interface. Hereinafter, a trusted WLAN and an untrusted WLAN may be both referred to as a WLAN.

2.1 IFOM

Data of a UE may be offloaded to the WLAN access through a 3GPP access. A technology such as IP flow mobility and seamless offload (IFOM), multi access PDN connectivity (MAPCON), or the like has been proposed to support a multiple radio access. The MAPCON technology is a technology of transmitting data by using a 3GPP access and a Wi-Fi access through respective PDN connections. The IFOM technology is a technology of transmitting data by aggregating the 3GPP access and the Wi-Fi access to one PDN or P-GW.

Figure 9:
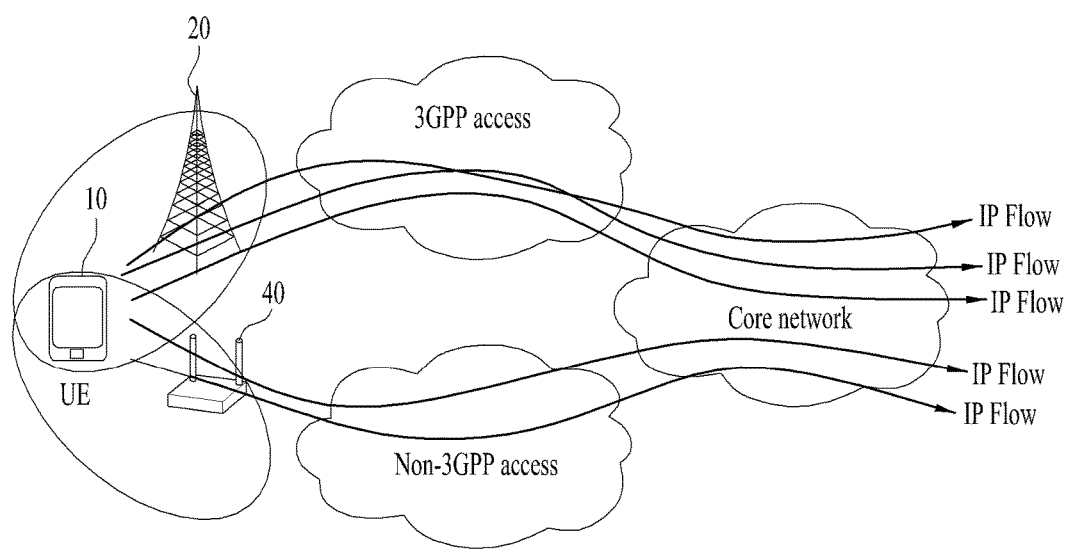
FIG. 9 is an exemplary view illustrating an example of IFOM (IP Flow Mobility) technology.

FIG. 9 is an exemplary view of the IFOM technology. Referring to FIG. 9, the IFOM technology is to provide the same PDN connection through several pieces of different accesses. Such IFOM technology provides seamless transmission and reception through offloading onto a WLAN. Furthermore, the IFOM technology provides the transfer of IP flows having the same one PDN connection from one access to the other access. As described above, with the help of the technologies capable of offloading the traffic of UE onto a WLAN, the congestion of a cellular access of a mobile communication service provider can be reduced.

The provider provides a policy to the UE in order to divert the traffic onto the WLAN access and the UE may divert its data onto the wireless LAN in accordance with the policy. For provision of the policy to the UE, a 3GPP based access network discovery and selection function (ANDSF) may provide a policy associated with the wireless LAN.

FIGS. 10(a) and 10(b) illustrate network control entities for selecting an access network. Referring to FIG. 10(a), the ANDSF may be present in the home network (Home Public Land Mobile Network ('HPLMN')) of the UE. Furthermore, referring to FIG. 10(b), the ANDSF may also be present in the Visited Public Land Mobile Network (VPLMN) of the UE. When the ANDSF is present in the home network as described above, it may be called an H-ANDSF. When the ANDSF is present in the visited network, it may be called a V-ANDSF. The ANDSF is used to include the H-ANDSF and/or the V-ANDSF. The ANDSF can provide information on an inter-system movement policy (ISMP), information for access network search and information on inter-system routing policy (ISRP), for example, a routing rule.

2.2 NBIFOM

Meanwhile, the IFOM is performed based on a decision primarily made by the UE, and as a result, the UE that can use the 3GPP access network and the WLAN access network at the same time may perform IP flow mobility between the two access networks.

Afterwards, the IFOM has evolved to the NBIFOM (network based IP flow mobility) technology which is the IFOM technology based on GTP or PMIP which is network based mobility protocol. In the NBIFOM, IP flow mobility may be performed by a leading decision and initiation of the network as well as IP flow mobility performed by initiation of the UE. The NBIFOM may be categorized into UE-initiated NBIFOM and network-initiated NBIFOM in accordance with an entity for triggering a decision of IP flow mobility. In the UE-initiated NBIFOM and the network-initiated NBIFOM, only one mode is used for one PDN connection. Therefore, multi-access PDN connection may be operated within a UE-initiated mode or a network-initiated mode. That is, mode selection is performed when PDN connection is established, and the same mode is maintained as far as PDN connection is in an active mode.

Figure 11:
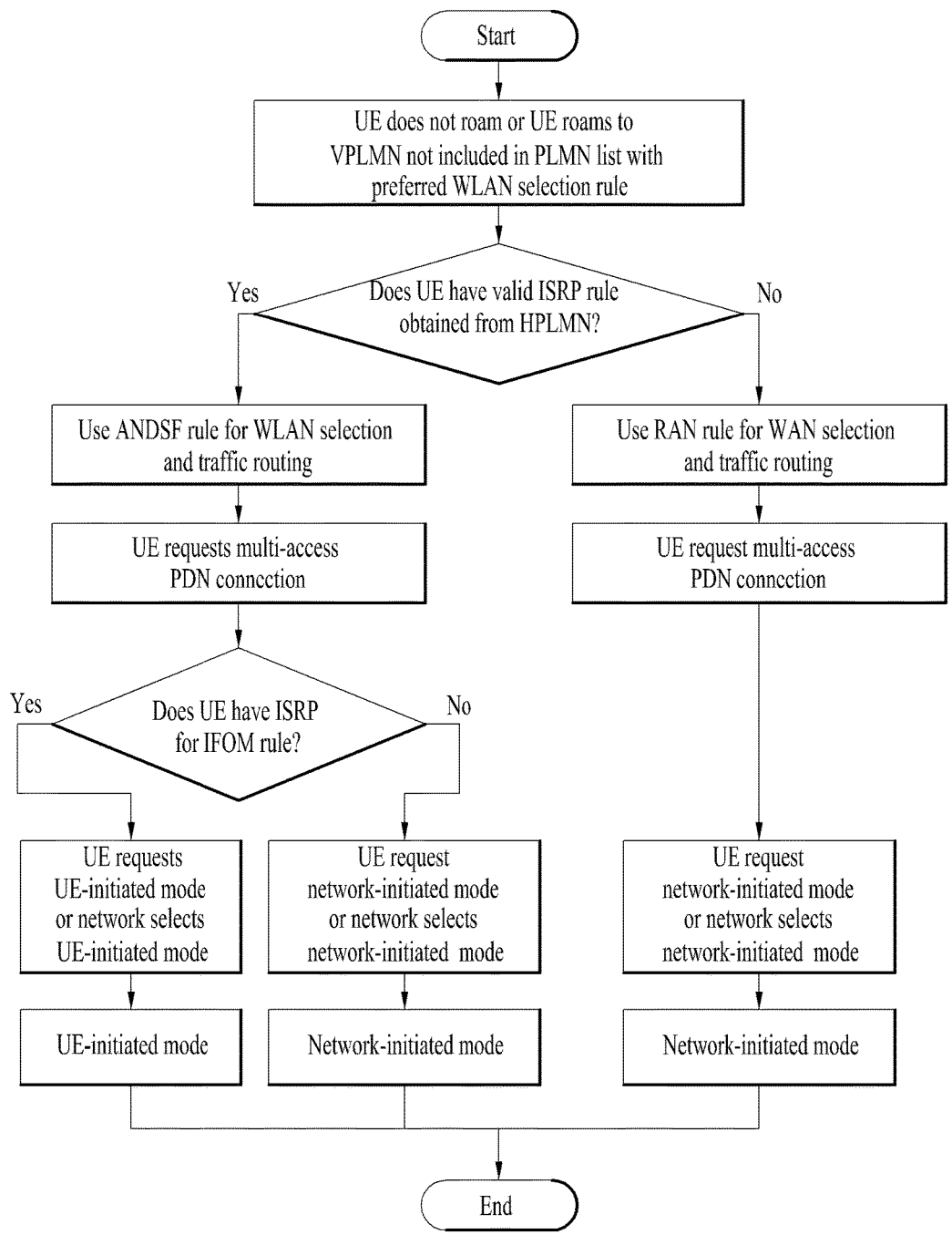
FIG. 11 illustrates a procedure of selecting any one of a UE-initiated mode and a network-initiated mode in NBIFOM.

Mode selection will be described in more detail with reference to FIG. 11. FIG. 11 illustrates a procedure of selecting any one of a UE-initiated mode and a network-initiated mode. Referring to FIG. 11, when a UE capable of performing NBIFOM intends to request multi-access PDN connection generation, the UE determines a mode for requesting the PDN connection generation. It is assumed that the UE supports both the ANDSF procedure and the RAN-assisted WLAN interworking. If the UE has not performed roaming to VPLMN or has performed roaming to VPLMN but uses a WLAN selection rule provided by HPLMN, the UE is determined to use the ANDSF protocol or RAN rule for WLAN selection and traffic routing depending on whether the UE has a valid ISRP protocol acquired from the HPLMN. If the UE has performed roaming to VPLMN and provided to use WLAN selection rule provided by the VPLMN, the UE is determined to use the ANDSF protocol or RAN rule for WLAN selection and traffic routing depending on the UE has a valid ISRP protocol acquired from the VPLMN. A later procedure is the same as that shown in FIG. 11.

If the UE has a valid ISRP, the UE determines to use the ANDSF protocol for WLAN selection and traffic routing. Subsequently, the UE performs an operation for requesting multi-access PDN connection generation. At this time, the UE determines whether it has ISRP for IFOM protocol. If the UE has ISRP for IFOM protocol, the UE requests PDN connection generation operated in the UE-initiated mode. Alternatively, the network selects the UE-initiated mode for the PDN connection. If the UE does not have ISRP for IFOM protocol, the UE requests the network-initiated mode. Alternatively, the network may select the network-initiated mode with respect to the PDN connection.

Meanwhile, if the UE does not have a valid ISRP, the UE determines to use the RAN rule for WLAN selection and traffic routing. Subsequently, the UE performs the operation for requesting multi-access PDN connection generation. At this time, the UE requests the PDN connection generation operated in the network-initiated mode. Alternatively, the network may select the network-initiated mode with respect to the PDN connection.

Figure 12:
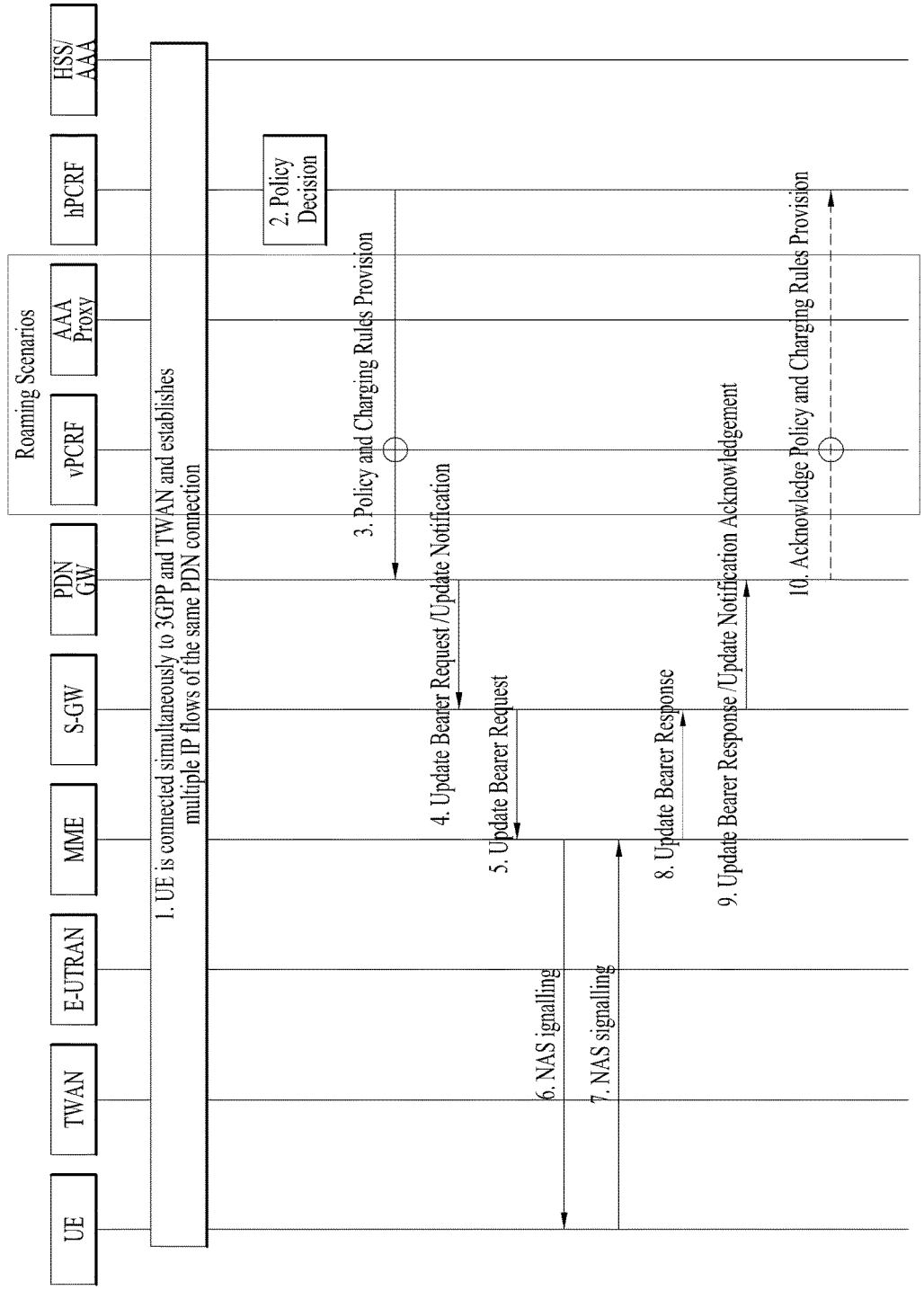
FIGS. 12 and 13 are flowcharts for explaining operating procedures for NBIFOM.
Figure 13:
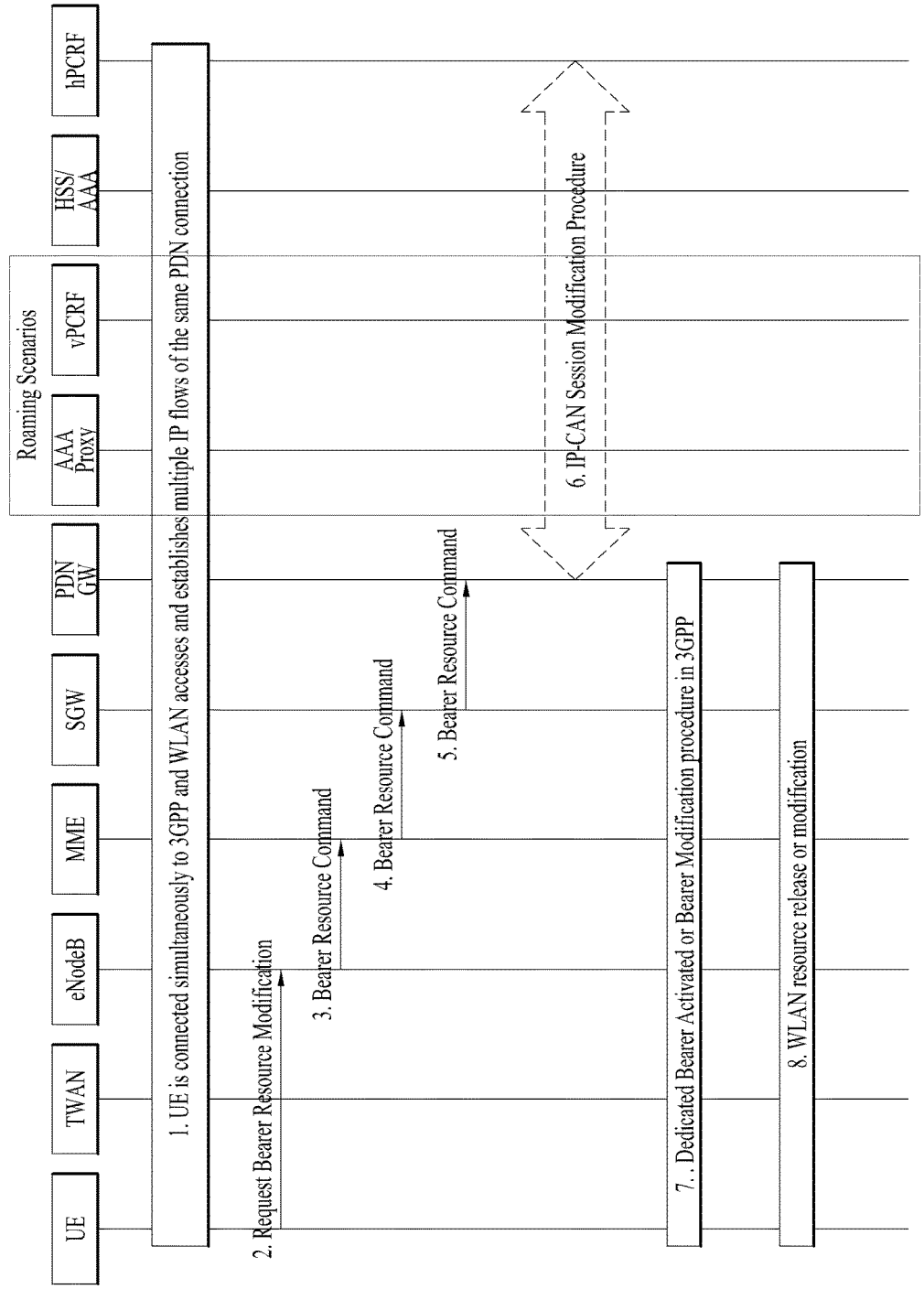

FIGS. 12 and 13 are flowcharts for explaining operating procedures for NBIFOM. Specifically, FIG. 12 illustrates a network initiation mode for the NBIFOM and FIG. 13 illustrates a UE initiation mode for the NBIFOM.

One of the main operations for the NBIFOM is a procedure for installing (establishing) a routing rule between a UE and a PGW. If the UE (or PGW) transmits the routing rule to the PGW (or UE), the PGW (or UE) may transmit a response message for approving/rejecting the routing rule. Meanwhile, as described above, an NBIFOM process can be divided into the UE initiation mode and the network initiation mode according to an entity that initiates the process.

The network initiation mode illustrated in FIG. 12 can be applied to non-roaming, home routed roaming, and local breakout. In the case of the local breakout, the PGW and hPCRF can exchange messages through vPCRF in VPLMN.

First of all, a UE is connected to a PGW through an E-UTRAN and TWAN. Thereafter, a PCRF determines to update the routing rule and this may be triggered when the network connected to the UE is changed or when a service data flow of the UE is changed.

After determining to update the routing rule, the PCRF transmits a Policy and Charging Rules Provision message including a new routing rule to the PGW. Having received the message, the PGW transmits an Update Bearer Request message or an Update Notification message (cf. RFC 7077) to an SGW. Such a message includes the new routing rule. Thereafter, the SGW forwards the received information to an MME through an Update Bearer Request message.

The MME transmits the routing rule to the UE through NAS signaling and the UE determines whether to approve or reject the new routing rule. The UE may transmit the approved routing rule to the MME through NAS signaling. Thereafter, the MME transmits an Update Bearer Response message to the SGW and in this case, the message may include the approved routing rule. The MME forwards the received information to the SGW through an Update Bearer Response message or an Update Notification Acknowledgement message. The PGW transmits an Acknowledge Policy and Charging Rules Provision message to the PCRF. In this case, the message may include the routing rule approved by the UE.

In the UE initiation mode illustrated in FIG. 13, a UE is simultaneously connected to a 3GPP network and a non-3GPP network and establishes multiple IP flows through a single PDN connection. The UE transmits a Request Bearer Resource Modification message to an eNB and in this case, the message includes information on the routing rule requested by the UE. The eNB transmits a Bearer Resource Command message to an MME and the message includes the information on the routing rule, which is received from the UE.

Thereafter, the MME forwards the received routing rule to a PGW through an SGW and the PGW initiates IP-CAN Session Modification Procedure and forwards the routing rule to a PCRF. The PGW performs a Dedicated Bearer Activated procedure or a Bearer Modification procedure to confirm the routing rule as described in TS 23.401. Next, a TWAN Resource Release/Modification procedure is performed with respect to resources related to flows eliminated during TWAN access as described in TS 23.402.

3.1 S-GW Relocation Triggered by MME

Figure 14:
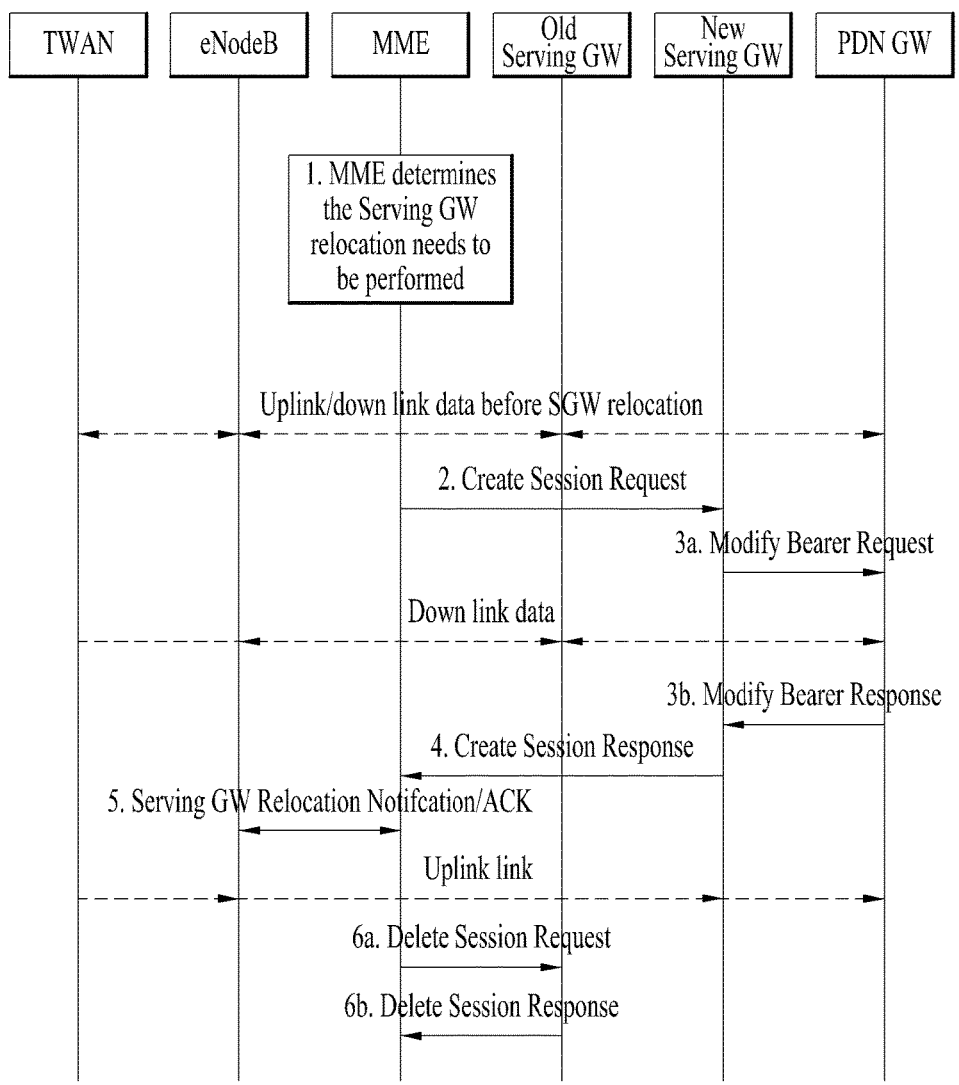
FIG. 14 is a flowchart for explaining an S-GW rearrangement procedure for a proposed embodiment.

FIG. 14 is a flowchart for explaining an S-GW rearrangement procedure for a proposed embodiment.

The S-GW relocation procedure triggered by the MME, which is defined in section 5.10.4 of TS 23.401 may correspond to a scenario in which a UE has no mobility but an intermediate node is changed. Such a scenario may occur when an independent GW performs SIPTO (Selected IP Traffic Offload) during a local network PDN connection or when the independent GW performs the SIPTO during a RAN PDN connection.

When the MME determines that the SGW relocation needs to be performed, the MME selects a new SGW based on section 4.3.8.2 of TS 23.401. The MME transmits a Create Session Request message for the PDN connection to the new SGW, and the new SGW allocates S-GW addresses and TEIDs for uplink traffic on S1_U reference point. Information on a protocol option to be used in the S5/S8 interface is also transmitted to the SGW. When the PGW requests location information of the UE, the MME transmits user location information IE (information element) to the SGW by including the user location information IE in the message. When the PGW requests user CSG information of the UE, which is determined by UE context, and the user CSG information is changed, the MME transmits the user CSG information IE to the new SGW by including the user CSG information IE in a Create Session request message.

The new SGW allocates addresses and TEIDs (in each bearer) for downlink traffic from the PGW and DL TEIDs for the S5/S8 interface. The new SGW transmits a Modify Bearer Request message for each PDN connection to the PGW. In addition, when transmitting the message, the SGW may also transmit the user location information IE, UE time zone IE and/or user CSG information IE to the PGW in response to the request from the PGW.

The PGW updates a context field and transmits a Modify Bearer Response message to the SGW. If the PGW stores MSISDN (Mobile Station International Subscriber Directory Number) in the UE context, the MSISDN can also be included in the message. Thereafter, the PGW starts to transmit a downlink packet to the new SGW using the received addresses and TEIDs. Such a downlink packet is transmitted to an eNB through the SGW using a new downlink path. The process at the PGW is performed for all PDN-GW connections for a specific UE.

The new SGW transmits a Create Session Response message to the MME, and the MME initiates a timer to be used later. The MME transmits an SGW Relocation Notification message to the eNB. Thereafter, the eNB starts to use the addresses and TEIDs of the new SGW for a next uplink packet.

When the aforementioned timer is expired, the MME transmits a Delete Session Request message to release the bearer of the old SGW. In this case, an operation indication flag is not configured and this may imply that the old SGW should not initiate a procedure for deleting the PGW. The old SGW transmits a Delete Session Response message to the MME in response to the Delete Session Request message.

In the case of failure of the SGW relocation procedure for the new SGW, the MME may disconnect the PDN connection under the impact (e.g., SIPTO of the local network), that is, the connection which is not allowed anymore by going back to the old SGW according to operator's policy.

3.2 Location Change Reporting

Figure 15:
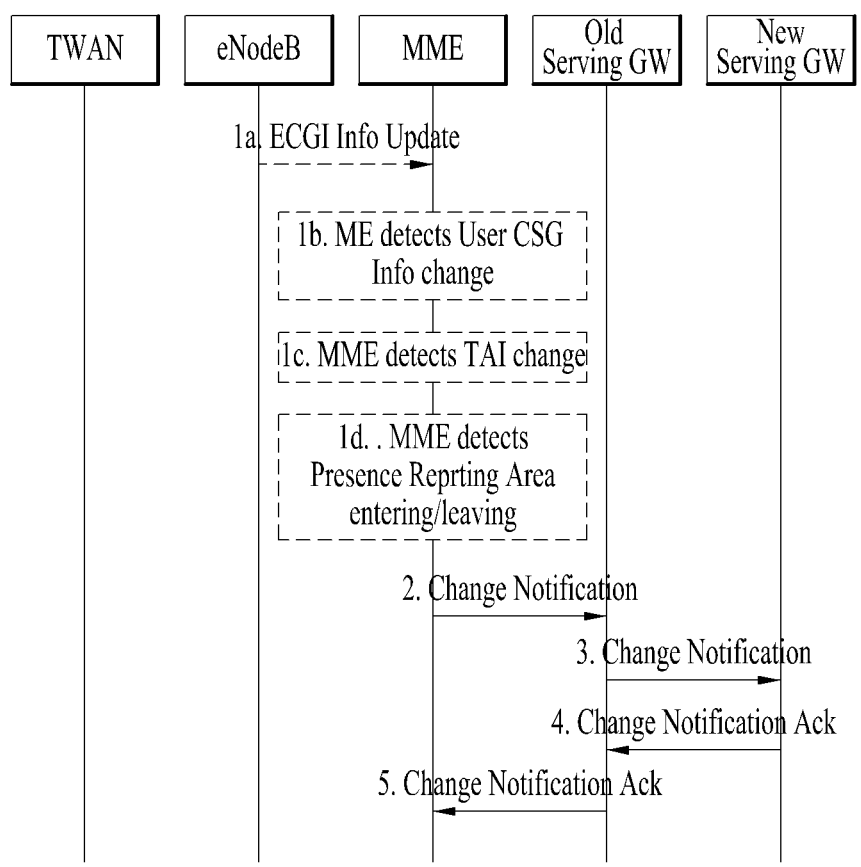
FIG. 15 is a flowchart for explaining a location change reporting procedure for a proposed embodiment.

FIG. 15 is a flowchart for explaining a location change reporting procedure for a proposed embodiment.

According to the location change reporting procedure described in section 5.9.2 of TS 23.401, when ECGI (E-UTRAN Cell Global Identifier)/TAI is changed for each PDN connection or when the UE enters a specific area (e.g., presence reporting area, which will be described later), the PGW requests the MME/SGSN to report this. In the former case, the PGW uses a 'MS info change reporting action' parameter and in the latter case, the PGW uses a 'presence reporting area action' parameter. In addition, the PGW can control such parameters through various (E)MM/(E)SM procedures. Further, the PGW may determine whether to request user CSG information change reporting (using a 'CSG information reporting action' parameter) together with the above requests.

The reporting procedure using at least one of the aforementioned parameters can be controlled by the PGW in order of access (attach)/TAU (Tracking Area Update)/Inter-RAT Mobility to E-UTRAN/Dedicated bearer activation/bearer modification initiated by the PGW (together with bearer QoS update)/bearer modification initiated by the PGW (without bearer QoS update)/PDN connectivity requested by the UE/bearer resource modification requested by the UE.

In addition, the PGW may request the MME to stop the above-described reporting. The MME operates based on the last explicit instruction received from the PGW or source MME/S4-SGSN.

FIG. 15 illustrates a procedure for triggering ECGI change reporting due to change in the ECGI. In the procedure illustrated in FIG. 15, user CSG information change reporting may be performed together with the ECGI change reporting. In addition, FIG. 15 shows TAI reporting and/or reporting when the UE enters or leaves the specific area (e.g., presence reporting area).

First of all, the MME receives ECGI Infor Update from the eNB. The MME compares stored user CSG information with the user CSG information to determine whether the user CSG information is changed, whether TAI of the UE is changed, and whether the UE enters or leaves presence reporting area defined for the UE.

If the PGW requests the MME to report a location change of the UE, the MME transmits a Change Notification message to the SGW. The Change Notification message may include new ECGI and/or user CSG information. The MME stores the reported user CSG information. If the MME is requested to report whether the UE is in the presence reporting area, the MME includes presence reporting area information in the Change Notification message. The presence reporting area information contains an area identifier and an indicator indicating whether the UE is within or outside of the corresponding area.

The SGW forwards the received Change Notification message to the PGW. When dynamic policy and charging control (PCC) is applied and the location change needs to be informed the PCRF, the PGW transmits related information to the PCRF as described in TS 23.203. If the presence reporting area information is received, the PGW transmits the presence reporting area information to at least one of the PCRF and an OCS. Thereafter, the PGW transmits the Change Notification message to the SGW, and the SGW forwards the Change Notification message to the MME.

In the case of policy control/charge determination, a QoS or charging rate may be changed depending on whether a UE is within or outside of a specific interesting area, in particular, whether the UE enters or leaves the interesting area. The reporting of whether a UE is in the presence reporting area or not is with respect to a specific UE and it can be triggered as described in TS 23.203. In addition, the PGW may request to start or stop the reporting.

In a UE-specific presence reporting area, the reporting of whether the UE is in the area may contain a 'presence reporting area action' parameter including a presence reporting area identifier and TA/RA/eNB/cell/SAI lists associated with the specific presence reporting area. In the case of a presence reporting area previously configured by the core network, a reporting request may be configured with the parameter including the presence reporting area identifier. In this case, a message requesting to stop the reporting may also include the presence reporting area identifier.

If it is requested to report change in whether the UE is in the presence reporting area, the MME transmits an identifier for the specific area and presence reporting area information indicating whether the UE is within or outside of the corresponding specific area through the SGW to the PGW. That is, the MME should inform the PGW of whether the UE enters or leaves the presence reporting area. However, UE's movement in the presence reporting area or outside thereof is not reported. When the presence of the UE in the presence reporting area is changed compared to the last reporting time, the reporting can be performed.

If a serving EPC node (e.g., MME, S4-SGSN, etc.) is changed, a target serving node can be provide with the presence reporting area identifier and lists associated with presence reporting area elements for all PDN connections as a part of MM context information. The target serving node informs a PGW corresponding to each PDN connection of the presence reporting area identifier and whether the UE is within or outside of the presence reporting area.

4. Proposed Method for Transmitting and Receiving NBIFOM Capability

Figure 16:
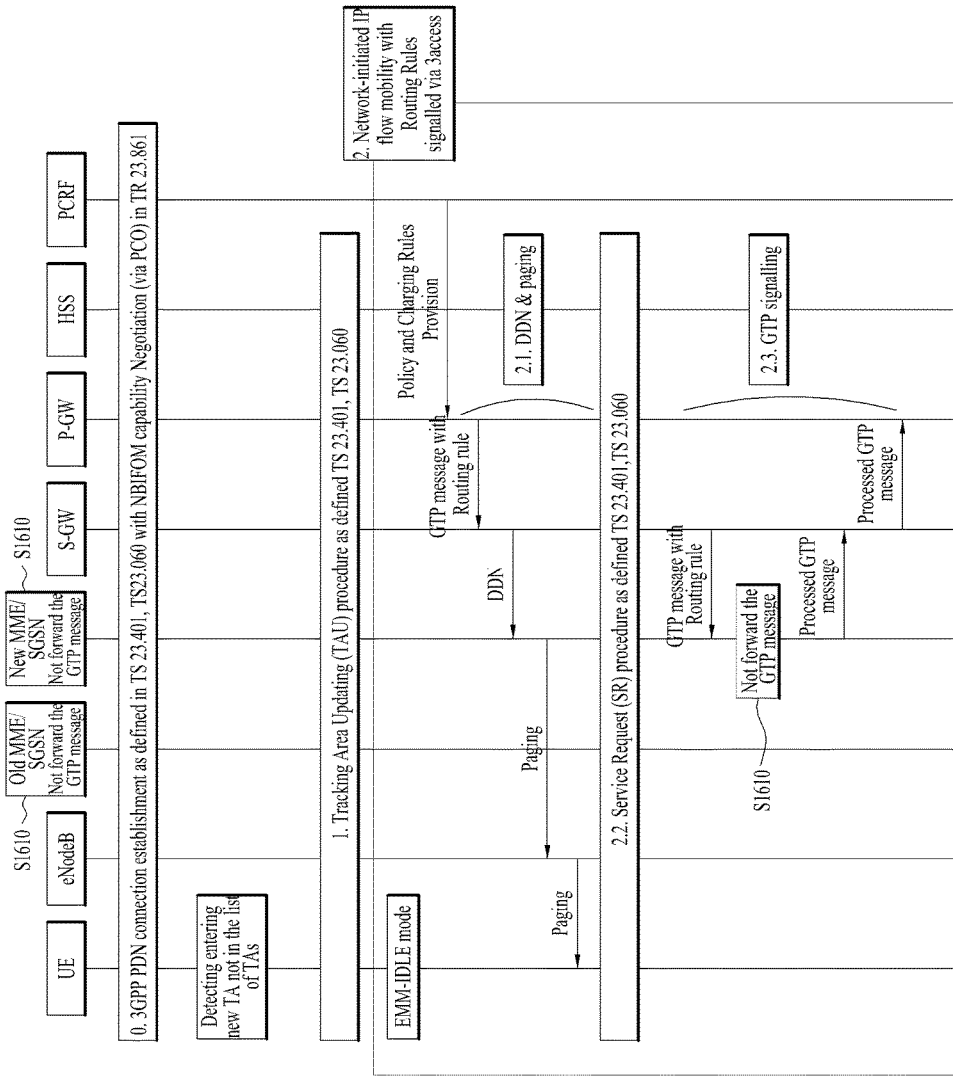
FIGS. 16 and 17 are diagrams for explaining an NBIFOM capability negotiation procedure in an environment where nodes supporting the NBIFOM and nodes not supporting the NBIFOM coexist.
Figure 17:
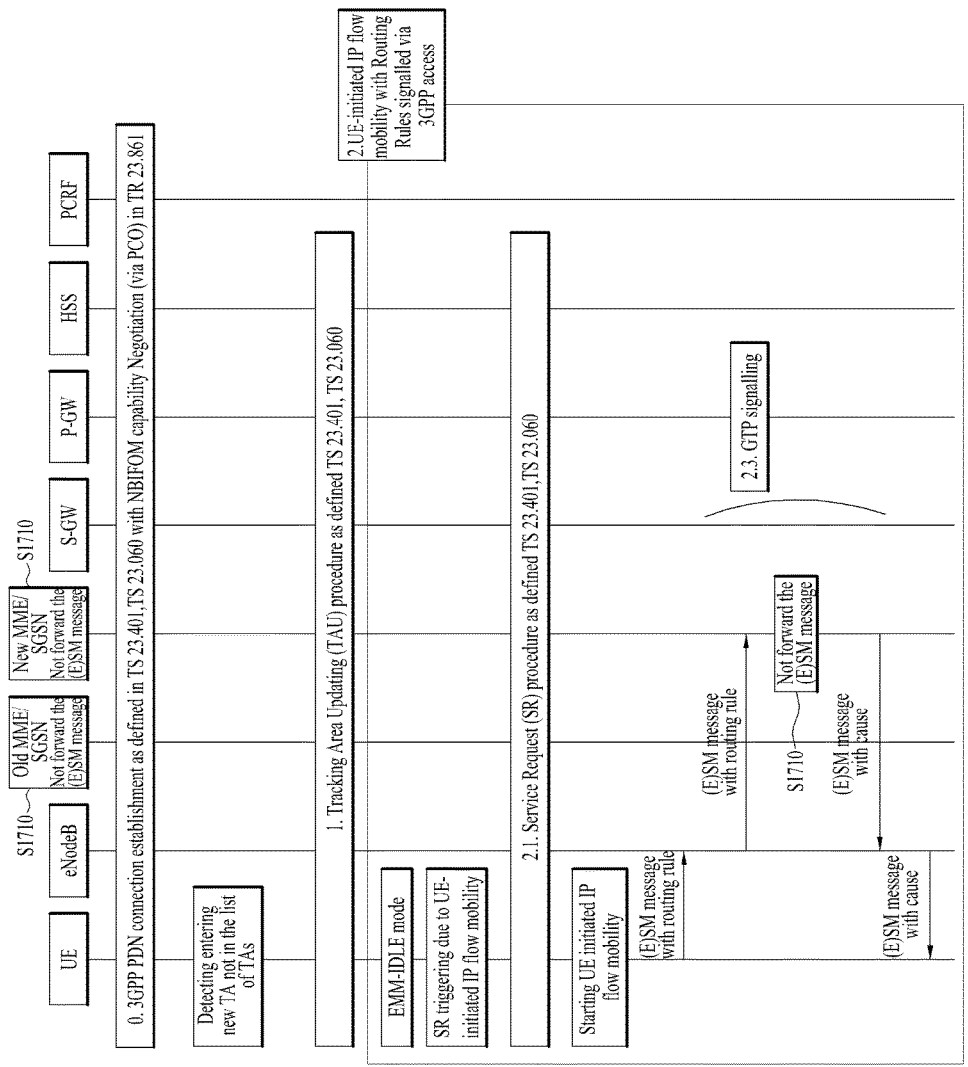

FIGS. 16 and 17 are diagrams for explaining an NBIFOM capability negotiation procedure in an environment where nodes supporting the NBIFOM and nodes not supporting the NBIFOM coexist.

A procedure in which the UE and the PGW to check their NBIFOM capabilities (or whether to support NBIFOM capabilities) is referred to as a 'NBIFOM capability negotiation' procedure. The NBIFOM capability negotiation procedure is performed while a PDN connection is established. Specifically, the NBIFOM capability negotiation procedure is performed as follows. When the UE transmits its own NBIFOM capability to the target, the PGW checks the UE's NBIFOM capability and responds if the PGW also supports the NBIFOM. According to a scheme of using control signaling, which is one of the solutions proposed in TR 23.861, the NBIFOM capability can be transmitted through a protocol configuration option (PCO).

To support the NBIFOM, intermediate nodes need to be improved such that the intermediate nodes can support the NBIFOM. In addition, to transfer a routing rule/filter, the conventional procedure needs to be modified and the intermediate nodes should support the modified procedure. Therefore, the intermediate nodes should inform the PGW of their own NBIFOM capabilities.

For example, the MME can use PCO and GTP indicators to inform whether the MME supports the NBIFOM. When the PGW receives, from the MME, information indicating that the MME supports the NBIFOM, the PGW can forward the information indicating that the MME supports the NBIFOM to the UE by including the information in the PCO. Alternatively, the UE can explicitly transmit an indicator for checking whether the MME supports the NBIFOM.

A case in which all intermediate nodes including the MME either support or not the NBIFOM is referred to as a homogeneous network and a case in which some intermediate nodes support the NBIFOM and other intermediate nodes do not support the NBIFOM is referred to as an inhomogeneous network or a heterogeneous network. Hereinafter, a description will be made focusing on an NBIFOM capability negotiation procedure in the heterogeneous network environment. Meanwhile, such a homogeneous/heterogeneous network may mean a network configured on a PLMN basis.

In the heterogeneous network where intermediate nodes have different NBIFOM capabilities, the NBIFOM capability negotiation can be performed when the UE and the PGW establish an initial PDN connection. In the following description, it is assumed that after the NBIFOM capability negotiation, the UE and the PGW can know that each of them supports the NBIFOM and intermediate nodes also support the NBIFOM. However, when intermediate nodes are changed (due to movement of the UE), a method for checking NBIFOM capabilities of new intermediate nodes is required.

As a method of checking an NBIFOM capability of an intermediate node, the following methods have been proposed: 1) a method in which the UE implicitly estimate whether the NBIFOM is supported when there is no explicit NBIFOM-related signaling; 2) a method in which the MME informs the PGW whether the NBIFOM is supported using a GTP indication; and 3) a method in which the UE checks whether the MME support the NBIFOM through an explicit indication. However, the above methods may cause unnecessary signaling overhead in the heterogeneous network environment where intermediate nodes (e.g., MME, SGSN, SGW, etc.) have different NBIFOM capabilities.

Among the conventional methods, the first method will be described on the premise of the heterogeneous network environment. While establishing the initial PDN connection, the UE may check NBIFOM capabilities of the PGW and intermediate nodes and then know that all of them support the NBIFOM. However, the UE may be in an EPS mobility management (EMM) idle state and move to an MME not supporting the NBIFOM. That is, the PGW and UE may not know that the new MME supports the NBIFOM. In addition, the PGW may not recognize that the UE moves to the new MME but recognize that the UE stays nearby the old MME having the NBIFOM capability.

In the case of network-initiated NBIFOM, since the PGW does not know whether intermediate nodes support the NBIFOM, the PGW transmits a downlink signal including the routing rule to the SGW. The SGW transmits a downlink data notification (DDN), and the MME transmits a paging message to the eNB. When the eNB forwards the paging message to the UE, the UE performs a service request procedure to transition (switch) to an EMM-connected state. Thereafter, although the SGW transmits the downlink signal including the routing rule to the MME, the MME cannot forward the signal because the MME does not have the NBIFOM capability [S1610 in FIG. 16]. Thus, the PGW can recognize that some or all of the intermediate nodes do not have the NBIFOM capability.

Next, in the case of UE-initiated NBIFOM, since the UE does not know whether intermediate nodes support the NBIFOM, the UE transitions to the EMM-connected state by performing the service request procedure. Thereafter, the UE transmits an uplink signal including the routing rule. However, since the MME does not have the NBIFOM capability, the MME cannot forward the uplink signal [S1710 in FIG. 17]. The MME transmits a state message (either the EMM state or the ESM state) representing cause #97, which is expressed as 'message type non-existent or not implemented'. Therefore, the UE can recognize that some or all of the intermediate nodes do not have the NBIFOM capability.

The steps 2.1, 2.2, and 2.3 show in FIG. 16 correspond to signaling overhead caused when the PGW does not know whether the MME supports the NBIFOM. Similarly, the steps 2.1 and 2.2 correspond to signaling overhead caused when the UE does not know whether the MME supports the NBIFOM. That is, it can be seen that such signaling overhead does not occur when either the PGW or the UE knows NBIFOM capabilities of the intermediate nodes.

Next, among the conventional methods, the method in which the PGW knows NBIFOM capabilities of the intermediate nodes in advance will be described on the premise of the heterogeneous network environment. Although the PGW knows the NBIFOM capabilities of the intermediate nodes through GTP signaling or an OAM scheme in advance, the PGW cannot know the current location of the UE when the UE is in the EMM-idle state. Thus, the PGW cannot know the MME/SGSN to which the UE currently belongs. In this case, the signaling overhead occurring in the UE-initiated NBIFOM may occur in the network-initiated NBIFOM. In addition, in the case of home routed traffic of the roaming case of the network-initiated NBIFOM, the UE uses an intermediate node of VPLMN and a PGW of HPLMN. In this case, since the PLMN used by the UE is different from that of the PGW, PGW's information on the intermediate nodes is not valid to the UE.

When the information on the intermediate nodes' NBIFOM capabilities is not known, significant signaling overhead may occur. In addition, even when the PGW knows the information on the intermediate nodes' NBIFOM capabilities in advance, the effect may be limited. Moreover, in the case of the UE-initiated NBIFOM, even when the UE knows the information on the intermediate nodes' NBIFOM capabilities in advance, the intermediate nodes may be changed and thus the information on the intermediate nodes' NBIFOM capabilities becomes invalid.

Meanwhile, when the UE is in the EMM-connected state, the PGW and UE may not know the intermediate nodes' NBIFOM capabilities. Specifically, when the UE is in the EMM-connected state, the remaining part of the step 2.3 except signaling for transitioning to the EMM-connected state compared to the EMM-idle state may be considered as the signaling overhead.

4.1 Embodiment 1

Figure 18:
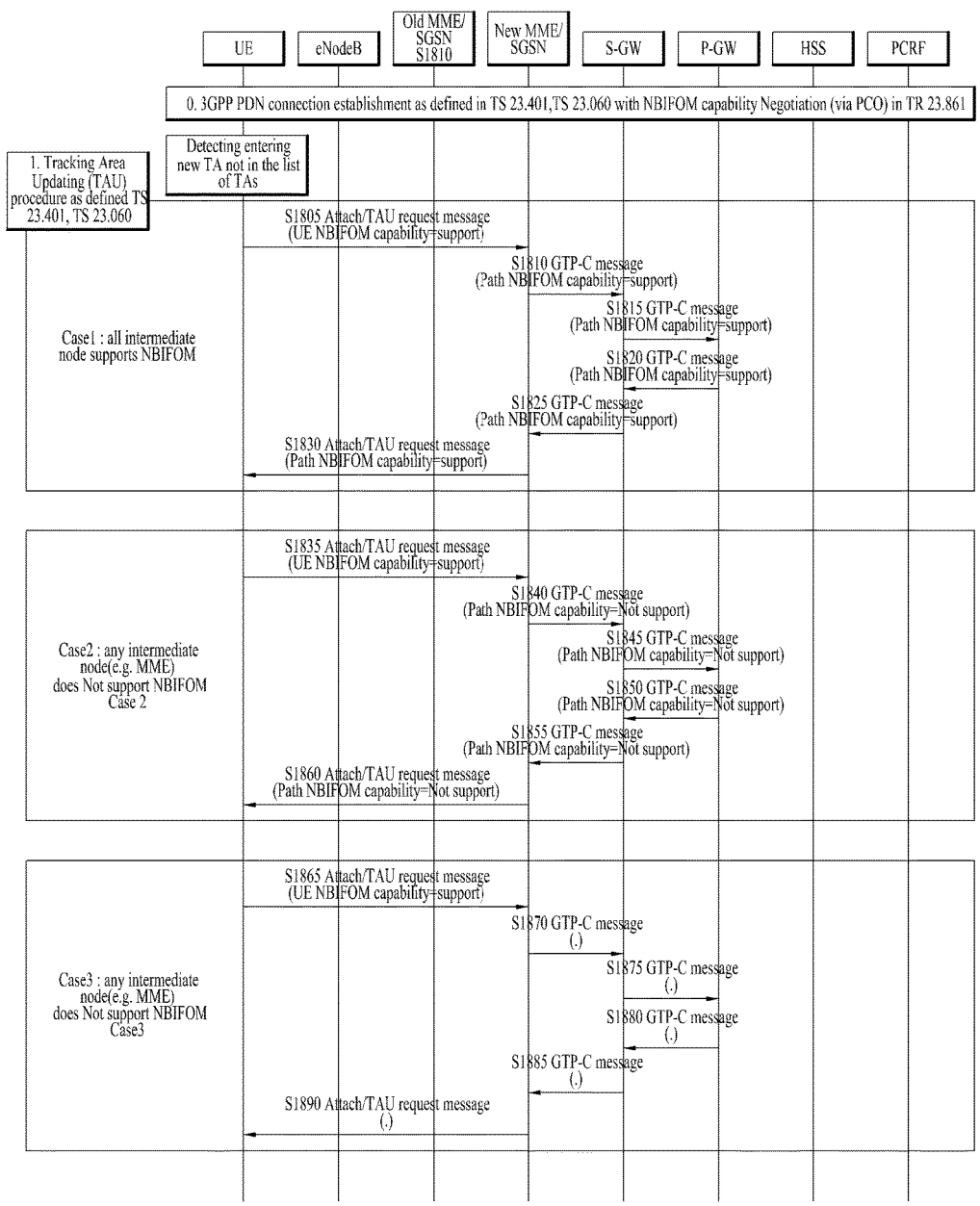
FIG. 18 a diagram for explaining a method for transmitting and receiving NBIFOM signals according to a proposed embodiment.

To solve the above-described problems, embodiments will be proposed relating to a method for transmitting and receiving an NBIFOM capability. Particularly, a description will be given of a method for transmitting and receiving NBIFOM capabilities of intermediate nodes in a heterogeneous network environment. FIG. 18 a diagram for explaining a method for transmitting and receiving NBIFOM signals according to a proposed embodiment.

According to an embodiment, the proposed NBIFOM capability transmission and reception method can be performed through any one of an attach procedure, a tracking area update (TAU) procedure, and a routing area update (RAU) procedure. In addition, the NBIFOM capabilities of the intermediate nodes can be informed a PGW and a UE through any one of the attach procedure, the TAU procedure, and the RAU procedure.

In FIG. 18, the case 1 corresponds to a case in which all intermediate nodes supports the NBIFOM, and the case 2 and case 3 correspond to a case in which at least one intermediate node does not support the NBIFOM. Specifically, the case 2 corresponds to an embodiment in which intermediate nodes explicitly inform that they do not support the NBIFOM, and the case 3 corresponds to an embodiment in which intermediate nodes do not transmit information indicating that they do not support the NBIFOM. However, in the case 3, when the NBIFOM is supported, information indicating that the NBIFOM is supported is explicitly transmitted. Thus, when no information is received, it can be deduced that the intermediate nodes do not support the NBIFOM.

Details of the embodiments of FIG. 18 will be described. First, the UE performs an NBIFOM capability negotiation procedure while establishing an initial PDN connection. The NBIFOM capability negotiation procedure can be performed through a protocol configuration option (PCO) included in an ESM session management message between the UE and PGW. When the PGW transmits a response message to the UE, the UE and PGW recognize that the NBIFOM can be supported for the corresponding PDN connection. During this procedure, the UE and PGW recognize that the intermediate nodes also support the NBIFOM.

Meanwhile, when the MME/SGSN supporting the UE is changed by movement of the UE, the TAU/RAU procedure can be performed according to the MME/SGSN change. Although the TAU/RAU procedure can be performed by various trigger conditions such as periodic TAU/RAU, it is assumed in the proposed embodiments that the TAU/RAU procedure is performed by the MME/SGSN change.

In the case 1, when the UE has the NBIFOM capability and the established PDN connection also supports the NBIFOM, after initiation of the TAU/RAU procedure (or the access procedure), information indicating that the UE has the NBIFOM capability is included in a TAU/RAU request message (or an attach request message and then the message is transmitted to a new MME/SGSN [S1805]. The information indicating that the UE has the NBIFOM capability can be configured by setting an 'UE NBIFOM capability' IE (or a different IE) as 'exist' or 'support'. Alternatively, prescribed bits can be used to indicate that the UE has the NBIFOM capability. The information indicating that the UE has the NBIFOM capability is include in the TAU request message, the attach request message, or the RAU request message and then transmitted to the MME/SGSN.

Having received the TAU/RAU message from the UE, the MME/SGSN can confirm that the UE has the NBIFOM capability. Since the MME/SGSN also supports the NBIFOM in the case 1, the MME/SGSN sets a path NBIFOM capability as 'exits' or 'support' and then transmit the path NBIFOM capability to an SGW [S1810]. The path NBIFOM capability indicates whether all intermediate nodes located along the path from the UE to the PGW support the NBIFOM and it may be defined as information included in a certain IE or field. Meanwhile, although the message transmitted from the MME/SGSN to the SGW may be the Create Session Request message in general, a different type of message among GTP-C messages can also be used.

Thereafter, the SGW confirms the path NBIFOM capability through the message received from the MME/SGSN and knows that both of the UE and the MME/SGSN have the NBIFOM capability. The SGW informs the PGW of its own NBIFOM capability. In the case 1, the SGW sets the path NBIFOM capability as 'exist' or 'support' and then transmits the path NBIFOM capability to the PGW [S1815]. According to the conventional TAU/RAU procedure, when the SGW connected to the UE is not changed, signaling (GTP signaling) between the SGW and PGW does not occur. However, according to the present embodiment, signaling between the SGW and PGW always occurs irrespective of the SGW change. Meanwhile, information on the SGW's NBIFOM capability may be included in a prescribed IE or field. In addition, the message transmitted from the SGW may be implemented as the Create Session Request message, the Modify Bearer Request message, or a different type of GTP-C message.

The PGW confirms the path NBIFOM capability through the message received from the SGW and knows that all of the UE, MME/SGSN and SGW have the NBIFOM capability. Thereafter, the PGW stores the path NBIFOM capability information and then transmits NBIFOM capability information indicating that all nodes constituting the PDN connection have the NBIFOM capability back to the SGW [S1820]. Such a procedure may be performed by transmitting the Create Session Response message, the Modify Bearer Response message, or a different type of GTP-C message.

Having received the message from the PGW, the SGW forwards the path NBIFOM capability information to the MME/SGSN [S1825]. Thereafter, the MME/SGSN transmits the path NBIFOM capability information to the UE using an Attach Accept message, a TAU Accept message, an RAU Accept message and the like [S1830]. Through the above-described procedures, the UE and PGW can check the intermediate nodes' NBIFOM capabilities.

Meanwhile, in the present embodiment, the path NBIFOM capability information is transmitted in the steps S1810, S1815, S1820, S1825, and S1830. In other words, the NBIFOM capability transmission and reception method is implemented by indicating that all intermediate nodes located along a prescribed path have NBIFOM capabilities.

However, each of the MME/SGSN and the SGW can separately inform its own NBIFOM capability. In other words, instead of the path NBIFOM capability, the MME/SGSN's NBIFOM capability and the SGW's NBIFOM capability can be separately transmitted [S1810, S1815, S1820, S1825, and S1830]. In addition, similar to the path NBIFOM capability transmission, the UE's NBIFOM capability information can be transmitted in the step S1805. In the steps S1810 and S1815, the UE's NBIFOM capability information can be separately transmitted. In the steps S1820, S1825, and S1830, the PGW's NBIFOM capability information can be separately transmitted.

According to an embodiment, to reduce signaling overhead, the NBIFOM capability transmission and reception procedure can be performed only when the intermediate node (e.g., MME/SGSN) is changed, instead of transmitting and receiving the NBIFOM capability in each attach procedure or each TAU/RAU request.

Next, details of the cases 2 and 3 will be described. In the cases 2 and 3, at least one intermediate node does not have the NBIFOM capability as described above. In the case 2, the NNE/SGSN receives the NBIFOM capability information from the UE [S1835]. When the MME/SGSN does not support the NBIFOM, the MME/SGSN sets the path NBIFOM capability information (or MME/SGSN NBIFOM capability information) at 'not support' or 'not exist' and then transmits the path NBIFOM capability information to the SGW [S1840]. The information and message transmitted from the MME/SGSN to the SGW can be configured as described in the case 1.

After confirming that the MME/SGSN does not have the NBIFOM capability, the SGW transmits related information to the PGW [S1845]. In response to the information, the PGW transmits a message indicating that the PGW confirms that the at least one intermediate node does not support the NBIFOM [S1850]. The SGW also confirms that the at least one intermediate node does not support the NBIFOM and transmits such information to the MME/SGSN [S1855]. Thereafter, the MME/SGSN forwards the information to the UE [S1860].

Instead of the path NBIFOM capability information, each intermediate node can independently transmit information indicating whether each node supports the NBIFOM in the steps S1840 to S1855.

In the case 2, information indicating that the NBIFOM is not supported is explicitly transmitted and received. Unlike the case 2, in the case 3, an entity not supporting the NBIFOM does not transmit the path NBIFOM capability information to another entity. That is, in case a certain message is received but the path NBIFOM capability information is not received, a network entity can confirm that at least one entity located along the current path does not support the NBIFOM.

4.2 Embodiment 2

In the embodiment 1, a UE, an intermediate node, and a PGW transmit and receive messages to inform their NBIFOM capabilities. In the embodiment 2, an MME/SGSN can autonomously transmit and receive information on NBIFOM capabilities of entities constituting the PDN connection to another network entity without intervention from the UE.

In the proposed embodiment, the MME/SGSN can store/manage/hold prescribed information related to the NBIFOM capabilities as context information. As an example of the information, information indicating whether the NBIFOM is applied to the PDN connection and information on the UE's NBIFOM capability is taken.

Particularly, when the UE performs the procedure for establishing the initial PDN connection, the MME/SGSN can recognize whether a specific PDN of the UE supports the NBIFOM through the NBIFOM capability negotiation procedure. In this case, the MME/SGSN may store, as the context information, that the NBIFOM is applied to the UE's PDN connection. In addition, when the MME/SGSN is changed, the MME/SGSN can transmit the corresponding context information to a new MME/SGSN.

Moreover, the MME/SGSN can obtain information on the UE's NBIFOM capability through the procedure in which the UE establishes the initial PDN connection, the attach procedure (the UE informs the MME/SGSN of the NBIFOM capability), or a procedure for receiving UE's subscriber information from a home subscribed server (HSS).

As described above, in case the MME/SGSN knows whether the NBIFOM is applied to the PDN connection or whether the UE supports the NBIFOM, if the intermediate node is changed, the MME/SGSN can initiate the NBIFOM capability transmission and reception procedure without intervention from the UE. That is, when the MME/SGSN confirms that the NBIFOM is applied to the PDN connection and the UE has the NBIFOM capability by checking its own information, the MME/SGSN can transmit the prescribed messages (i.e., Create Session Request message, Modify Bearer Request message, GTP-C message, etc.) in the steps S1810, S1840, and S1870. If the NBIFOM capabilities of the MME/SGSN, SGW, and PGW are confirmed, the MME/SGSN may transmit an access approval message or a TAU/RAU approval message to the UE.

In other words, when the MME/SGSN has the information indicating whether the UE has the NBIFOM capability and the information indicating whether the NBIFOM is applied to the PDN connection as the context information, the steps S1805, S1835, and S1865 in which the UE transmits messages to the MME/SGSN can be skipped.

4.3 Embodiment 3

Hereinabove, the NBIFOM transmission and reception method has been described based on the scenario in which an intermediate node is changed by movement of a UE. However, an intermediate node can be changed when a UE does not move. Hereinafter, an embodiment for the NBIFOM capability transmission and reception method performed when there is no TAU/RAU procedure due to change of the MME/SGSN will be described.

When the UE does not move, the MME determines that the SGW needs to be relocated. In this case, the MME can transmit a signal for requesting the SGW relocation through a new SGW to the PGW (c.f., the aforementioned SIPTO). While the MME/SGSN, SGW, and PGW transmit and receive signals based on the SIPTO scenario, some or all of the steps S1810, S1815, S1820, and S1825 (or S1840, S1845, S1850, and S1855 or S1870, S1875, S1880, and S1885) can be performed in the similar manner. In addition, the MME/SGSN and PGW can confirm the new SGW's NBIFOM capability during the signaling procedure according to the SIPTO scenario.

Besides the signaling procedure according to the SIPTO scenario, if the MME/SGSN, SGW or PGW determines that an intermediate node is changed, some or all steps of the aforementioned NBIFOM capability method can be performed. In this embodiment, the NBIFOM capability is transmitted and received without intervention from the UE.

Meanwhile, after receiving messages from the new SGW based on the signaling procedure according to the SIPTO scenario, the MME/SGSN may directly transmit the obtained NBIFOM capability information of intermediate nodes to the UE. Alternatively, the MME/SGSN may wait for another message transmission process. In the former case, since the attach procedure or TAU/RAU request procedure is not initiated by the UE, the MME may configure an extra EMM message (e.g., EMM information message, NAS transport message, general NAS transport message, etc.) or an ESM message in order to transmit the information on the intermediate nodes' NBIFOM capabilities to the UE. In the latter case, the MME/SGSN may wait until when the UE initiates a new attach procedure or TAU/RAU request procedure and then transmit the information on the intermediate nodes' NBIFOM capabilities by including it in a response message for the new procedure.

4.4 Embodiment 4

Meanwhile, when a UE moves from an MME/SGSN supporting the NBIFOM to a legacy MME/SGSN not supporting the NBIFOM, the legacy MME/SGSN does not transmit NBIFOM capabilities to another network entity because the legacy MME/SGSN cannot accept the operation described in the embodiments. In this scenario, since a PGW does not receive any information from the legacy MME/SGSN, the PGW may have a problem that the UE still stays at the MME/SGSN supporting the NBIFOM. In other words, when the UE changes its MME/SGSN, the PGW cannot receive information indicating whether the MME/SGSN is changed or NBIFOM capability information of the new MME/SGSN. Thus, the PGW may determine that the UE still stays at the MME/SGSN supporting the NBIFOM. If the PGW transmits a routing rule to the UE after determining that the UE still stays at the MME/SGSN supporting the NBIFOM, it may cause a problem of causing the same signaling overhead as that in the conventional network-initiated NBIFOM.

To solve the problem, the UE should inform the PGW of the MME/SGSN change. When the PGW receives the information indicating the MME/SGSN change but fails to receive NBIFOM capability information of intermediate nodes (or path NBIFOM capability information), the PGW can know that the UE's current nodes in the PDN connection do not support the NBIFOM. However, a scheme of informing that the MME/SGSN is changed needs to be performed such that it does not affect an MME/SGSN or the legacy MME/SGSN should understand the scheme. To this end, the following two schemes are proposed.

First, reporting can be performed using the PCO. An embodiment of using the PCO corresponds to a reporting scheme that does not affect the legacy MME/SGSN. According to this embodiment, after recognizing the fact that the MME/SGSN is changed, the UE can inform the PGW of the MME/SGSN change through the PCO. In other words, the UE not only performs the NBIFOM capability transmission and reception method according to the aforementioned embodiment in order to inform the MME/SGSN of its own NBIFOM capability but also transmits, to the PGW, the fact that the MME/SGSN is changed through the PCO in an explicit manner. That is, the UE enables to the PGW to accurately estimate the NBIFOM capabilities of the intermediate nodes connected to the current UE's PDN. When the PGW receives the information indicating that the MME/SGSN is changed even though the PGW does not receive the NBIFOM capabilities, the PGW can determine that at least one intermediate node connected to the current UE's PDN does not have the NBIFOM capability.

Meanwhile, an ESM procedure needs to be performed in order for the UE to transmit the PCO to the PGW and the ESM procedure is performed when the UE is in the EMM-connected state. Thus, if the UE is in the EMM-idle state, the UE needs to transition to the EMM-connected state. When the intermediate node is changed, the UE initiates a service request procedure at the end of the TAU/RAU procedure by setting an active flag of the TAU/RAU procedure to '1' in order to transition to the EMM-connected state. Thereafter, the UE can transmit the PCO to the PGW through an ESM message. On the other hand, if the UE is in the EMM-connected state, the UE can directly transmit the PCO to the PGW by initiating the ESM procedure.

Different from the PCO, a location change reporting procedure can be used. The location change reporting procedure can be understood by the legacy MME/SGSN. According to the location change reporting procedure, when UE's ECGI/TAI is changed in each PDN connection or when the UE enters a presence reporting area (PRA), the PGW can set the MME/SGSN to report it.

If it is determined using the location change reporting procedure that the NBIFOM can be applied to the PDN through the NBIFOM capability negotiation procedure, which is performed while the UE establishes the initial PDN connection, the PGW may request the MME/SGSN to report a location change for the PDN connection. In this case, an 'MS info change reporting action' parameter or a 'presence reporting area action' parameter can be used for the location change reporting procedure. When the 'presence reporting area action' parameter is used, a TA list covered by the current MME/SGSN can be set to the PRA. That is, if the UE leaves or enters an area covered by the MME/SGSN, the MME/SGSN may be changed. After receiving the location change report, the old MME/SGSN forwards this to the PGW. Thus, the PGW can recognize that the MME/SGSN connected to the UE is changed. Thereafter, the PGW requests to the new MME/SGSN to perform the location change reporting again in order to set a TA list covered by the new MME/SGSN to the PRA. In addition, if the location change report is maintained as MME context information, the PGW may not request the new MME/SGSN to perform the location change reporting. When the NBIFOM of the corresponding UE is not used anymore, the PGW terminates the location change reporting procedure.

5. Device Configurations

Figure 19:
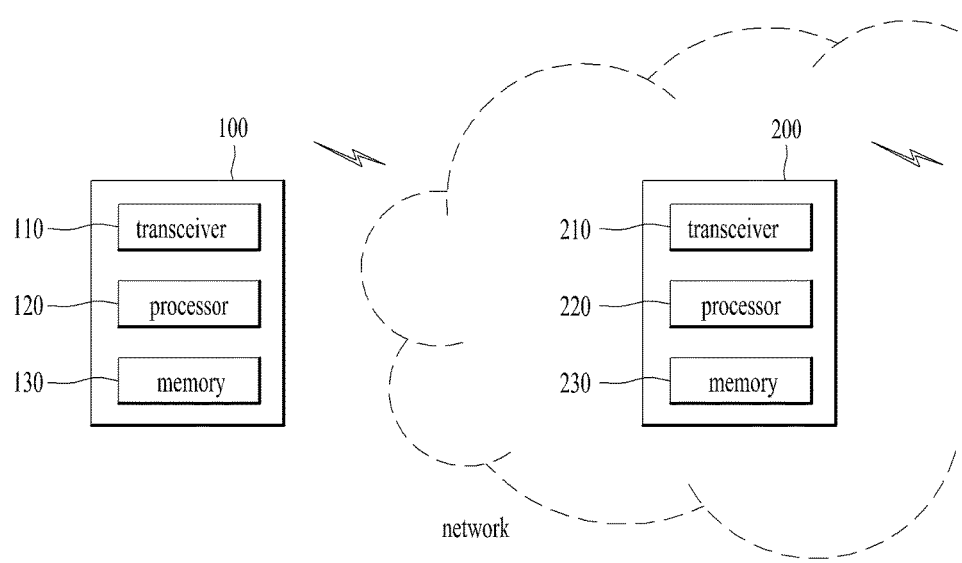
FIG. 19 is a diagram illustrating configurations of node devices according to a proposed embodiment.

FIG. 19 is a diagram illustrating configurations of node devices according to a proposed embodiment.

A user equipment (UE) 100 may include a transceiver 110, a processor 120, and a memory 130. The transceiver 110 may be configured to transmit and receive various signals, data, and information to/from an external device. Alternatively, the transceiver 110 may be implemented with a combination of a transmitter and a receiver. The UE 100 may be connected to the external device by wire and/or wirelessly. The processor 120 may be configured to control overall operations of the UE 100 and process information to be transmitted and received between the UE 100 and the external device. Moreover, the processor 120 may be configured to perform the UE operation proposed in the present invention. The memory 130, which may be replaced with an element such as a buffer (not shown in the drawing), may store the processed information for a predetermined time.

Referring to FIG. 19, a network node 200 according to the present invention may include a transceiver 210, a processor 220, and a memory 230. The transceiver 210 may be configured to transmit and receive various signals, data, and information to/from an external device. The network node 200 may be connected to the external device by wire and/or wirelessly. The processor 220 may be configured to control overall operations of the network node 200 and process information to be transmitted and received between the network node device 200 and the external device. Moreover, the processor 220 may be configured to perform the network node operation proposed in the present invention. The memory 230, which may be replaced with an element such as a buffer (not shown in the drawing), may store the processed information for a predetermined time.

The specific configurations of the UE 100 and the network node 200 may be implemented such that the aforementioned various embodiments of the present invention can be independently applied or two or more embodiments can be simultaneously applied. For clarity, redundant description will be omitted.

The embodiments of the present invention may be implemented using various means. For instance, the embodiments of the present invention may be implemented using hardware, firmware, software and/or any combinations thereof.

In case of the implementation by hardware, a method according to each embodiment of the present invention may be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code may be stored in a memory unit and be then executed by a processor. The memory unit may be provided within or outside the processor to exchange data with the processor through the various means known to the public.

As mentioned in the foregoing description, the detailed descriptions for the preferred embodiments of the present invention are provided to be implemented by those skilled in the art. While the present invention has been described and illustrated herein with reference to the preferred embodiments thereof, it will be apparent to those skilled in the art that various modifications and variations can be made therein without departing from the spirit and scope of the invention. Therefore, the present invention is non-limited by the embodiments disclosed herein but intends to give a broadest scope matching the principles and new features disclosed herein.

INDUSTRIAL APPLICABILITY

The aforementioned NBIFOM capability transmission and reception method can be applied to not only the 3GPP system but also various wireless communication systems including an IEEE 802.16x system and an IEEE 802.11x system. Further, the proposed method can also be applied to an mmWave communication system using super-high frequency band.

What is claimed is:

1. A method for transmitting and receiving information on a capability supporting a specific protocol by a serving gateway (S-GW), the method comprising:
receiving from a mobility management entity (MME), a first message comprising a first information element (IE) used for informing that the specific protocol is supported by a user equipment (UE) and the MME; and
when the S-GW supports the specific protocol, transmitting to a packet gateway (P-GW), a second message comprising a second IE used for informing that the UE, the MME and the S-GW support the specific protocol.

2. The method of claim 1,
wherein the first message comprises a Create Session Request message transmitted from the MME, and
wherein the second message comprises a Create Session Request message transmitted from the S-GW.

3. The method of claim 2, further comprising:
receiving, from the P-GW, a third message comprising a third IE used for informing that the UE, the MME, the S-GW and the P-GW support the specific protocol; and
transmitting, to the MME, a fourth message comprising a fourth IE used for informing that the UE, the MME, the S-GW and the P-GW support the specific protocol.

4. The method of claim 3, wherein:
the third message comprises a Create Session Response message transmitted from the P-GW, and
the fourth message comprises a Create Session Response message transmitted from the S-GW.

5. The method of claim 1, wherein the specific protocol comprises a network-based internet protocol flow mobility (NBIFOM) protocol.

6. A serving gateway (S-GW) for transmitting and receiving information on a capability supporting a specific protocol, the S-GW comprising:
a memory; and
a processor operably coupled to the memory and configured to:
receive from a mobility management entity (MME), a first message comprising a first information element (IE) used for informing that the specific protocol is supported by a user equipment (UE) and the MME; and
transmit to a packet gateway (P-GW), a second message comprising a second IE used for informing that the UE, the MME and the S-GW support the specific protocol, when the S-GW supports the specific protocol.

7. A method for transmitting and receiving information on a capability supporting a specific protocol at a user equipment (UE), the method comprising:
transmitting, to a mobility management entity (MME), a first message comprising a first information element (IE) used for informing that the UE supports the specific protocol; and
receiving, from the MME, a second message comprising a second IE used for informing that the MME, a serving gateway (S-GW) and a packet gateway (P-GW) support the specific protocol, when the MME, the S-GW and the P-GW support the specific protocol.

8. The method of claim 7 wherein the first message comprises an attach request message, or a tracking area update (TAU) request message.

9. The method of claim 7, wherein the second message comprises an attach accept message, or a tracking area update (TAU) accept message.

10. A user equipment (UE) for transmitting and receiving information on a capability supporting a specific protocol, the UE comprising:
- a memory; and
- a processor operably coupled to the memory and configured to:
- transmit to a mobility management entity (MME), a first message comprising a first information element (IE) used for informing that the UE supports the specific protocol; and
- receive from the MME, a second message comprising a second IE used for informing that the MME, a serving gateway (S-GW) and a packet gateway (P-GW) support the specific protocol, when the MME, the S-GW and the P-GW support the specific protocol.

* * * * *